(12) United States Patent
Nagai et al.

(10) Patent No.: US 12,293,874 B2
(45) Date of Patent: May 6, 2025

(54) ELECTRONIC COMPONENT

(71) Applicant: TDK CORPORATION, Tokyo (JP)

(72) Inventors: Yuichi Nagai, Tokyo (JP); Natsumi Kato, Tokyo (JP); Akitoshi Yoshii, Tokyo (JP); Ken Morita, Tokyo (JP); Takehisa Tamura, Tokyo (JP); Atsushi Takeda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 216 days.

(21) Appl. No.: 17/939,819

(22) Filed: Sep. 7, 2022

(65) Prior Publication Data

US 2023/0095767 A1  Mar. 30, 2023

(30) Foreign Application Priority Data

Sep. 28, 2021 (JP) .............................. 2021-157837

(51) Int. Cl.
*H01G 4/012* (2006.01)
*H01G 4/232* (2006.01)
*H01G 4/30* (2006.01)

(52) U.S. Cl.
CPC ............ *H01G 4/012* (2013.01); *H01G 4/232* (2013.01); *H01G 4/30* (2013.01)

(58) Field of Classification Search
CPC ........... H01G 4/012; H01G 4/232; H01G 4/30
See application file for complete search history.

(56) References Cited

U.S. PATENT DOCUMENTS

| | | | |
|---|---|---|---|
| 2009/0154055 A1* | 6/2009 | Takashima | H01G 4/30 361/301.4 |
| 2010/0039749 A1* | 2/2010 | Ritter | H01G 4/005 29/25.42 |
| 2012/0075766 A1* | 3/2012 | Nishioka | H01G 4/005 361/301.4 |
| 2013/0020905 A1* | 1/2013 | Sawada | H01G 4/012 336/200 |
| 2013/0170095 A1* | 7/2013 | Oh | H01G 4/008 361/305 |

(Continued)

FOREIGN PATENT DOCUMENTS

| | | |
|---|---|---|
| JP | 2005-235976 A | 9/2005 |
| JP | 2011-151224 A | 8/2011 |

(Continued)

*Primary Examiner* — Michael P McFadden
(74) *Attorney, Agent, or Firm* — Oliff PLC

(57) ABSTRACT

Each of a plurality of internal electrodes is electrically connected to a corresponding external electrode of a plurality of external electrodes. A plurality of auxiliary internal electrodes are disposed in the same layer as the plurality of internal electrodes to be located between each of a pair of side surfaces and the plurality of internal electrodes. Each of the plurality of external electrodes includes a pair of side surface electrode portions disposed on the pair of side surfaces and including a conductive resin layer. Each of the plurality of auxiliary internal electrodes is electrically connected to the external electrode to which the internal electrode located in the same layer is not electrically connected, and is located between the conductive resin layer to which the internal electrode located in the same layer is not electrically connected and the internal electrode located in the same layer.

35 Claims, 14 Drawing Sheets

(56) References Cited

U.S. PATENT DOCUMENTS

| | | | |
|---|---|---|---|
| 2015/0255213 A1* | 9/2015 | Lee | H01G 4/005 |
| | | | 174/258 |
| 2016/0240317 A1* | 8/2016 | Ro | H01G 4/30 |
| 2018/0090273 A1* | 3/2018 | Hwang | H01G 4/2325 |
| 2019/0237259 A1 | 8/2019 | Onodera et al. | |
| 2020/0043656 A1* | 2/2020 | Kim | H01G 4/012 |
| 2020/0411243 A1* | 12/2020 | Kim | H01G 4/2325 |
| 2022/0084752 A1* | 3/2022 | Kato | H01G 4/0085 |
| 2022/0139627 A1* | 5/2022 | Kim | H01G 4/30 |
| | | | 361/301.4 |

FOREIGN PATENT DOCUMENTS

| | | |
|---|---|---|
| JP | 2018-6501 A | 1/2018 |
| JP | 2019-134066 A | 8/2019 |

\* cited by examiner

ELECTRONIC COMPONENT

BACKGROUND OF THE INVENTION

1. Field of the Invention

The present invention relates to an electronic component.

2. Description of Related Art

Known electronic components include an element body of a rectangular parallelepiped shape, a plurality of external electrodes, and a plurality of internal electrodes (see, for example, Japanese Unexamined Patent Publication No. 2018-006501). The element body includes a pair of main surfaces opposing each other in a first direction, a pair of end surfaces opposing each other in a second direction, and a pair of side surfaces opposing each other in a third direction. The plurality of external electrodes are disposed on both ends of the element body in the second direction. The plurality of internal electrodes are disposed in the element body to be distributed in the first direction, and are electrically connected to corresponding external electrodes of the plurality of external electrodes. Each of the plurality of external electrodes includes a pair of side surface electrode portions disposed on the pair of side surfaces and including a conductive resin layer.

SUMMARY OF THE INVENTION

The conductive resin layer generally includes a plurality of metal particles and a resin. In a configuration in which the external electrode includes a conductive resin layer, migration may occur in the external electrode. Migration is considered to occur due to the following events, for example.

An electric field generated between the side surface electrode portion and the internal electrode to which the side surface electrode portion is not electrically connected acts on the metal particle included in the conductive resin layer, and the metal particle is ionized. Generated metal ion is attracted by an electric field generated between the external electrodes and migrates from the conductive resin layer. The metal ion migrating from the conductive resin layer react with, for example, an electron supplied from the element body, and is deposited as metal on the surface of the element body.

An object of each of aspects of the invention is to provide an electronic component controlling occurrence of migration even when an external electrode includes a conductive resin layer.

An electronic component according to one aspect of the invention includes an element body of a rectangular parallelepiped shape, a plurality of external electrodes, a plurality of internal electrodes, and a plurality of auxiliary internal electrodes. The element body includes a pair of main surfaces opposing each other in a first direction, a pair of end surfaces opposing each other in a second direction, and a pair of side surfaces opposing each other in a third direction. The plurality of external electrodes are disposed on both ends of the element body in the second direction. The plurality of internal electrodes are disposed in the element body to be distributed in the first direction, and each of the plurality of internal electrodes is electrically connected to a corresponding external electrode of the plurality of external electrodes. The plurality of auxiliary internal electrodes are disposed in the same layer as the plurality of internal electrodes to be located between each of the pair of side surfaces and the plurality of internal electrodes. Each of the plurality of external electrodes includes a pair of side surface electrode portions disposed on the pair of side surfaces and including a conductive resin layer. Each of the plurality of auxiliary internal electrodes is electrically connected to the external electrode to which the internal electrode located in the same layer is not electrically connected, and is located between the conductive resin layer to which the internal electrode located in the same layer is not electrically connected and the internal electrode located in the same layer.

In the one aspect described above, the auxiliary internal electrode is located between the side surface electrode portion electrically connected to the auxiliary internal electrode and the internal electrode not electrically connected to the side surface electrode portion. The auxiliary internal electrode is located between the side surface electrode portion and the internal electrode that are not electrically connected to each other. Therefore, the side surface electrode portion and the internal electrode that are not electrically connected to each other tend not to directly oppose each other in the third direction. An electric field tends not to be generated between the conductive resin layer included in the side surface electrode portion and the internal electrode that are not electrically connected to each other. Consequently, the one aspect controls occurrence of migration.

In the one aspect described above, in the two conductive resin layers located on the same side surface, one of the conductive resin layers may include an edge opposing the other conductive resin layer. With a plane including the end surface as a reference plane, a first length of the auxiliary internal electrode from the reference plane in the second direction may be larger than a second length from the reference plane to the edge of the conductive resin layer to which the auxiliary internal electrode is electrically connected. The first length may be smaller than a third length from the reference plane to the edge of the conductive resin layer to which the auxiliary internal electrode is not electrically connected.

In a configuration in which the first length is larger than the second length, the side surface electrode portion and the internal electrode that are not electrically connected to each other tend not to reliably and directly oppose each other in the third direction. An electric field further tends not to be generated between the conductive resin layer included in the side surface electrode portion and the internal electrode that are not electrically connected to each other.

In a configuration in which the first length is smaller than the third length, the auxiliary internal electrode tends not to oppose the side surface electrode portion, to which the auxiliary internal electrode is not electrically connected, in the third direction. An electric field tends not to be generated between the conductive resin layer included in the side surface electrode portion and the auxiliary internal electrode that are not electrically connected to each other.

A configuration in which the first length is larger than the second length and smaller than the third length further controls the occurrence of the migration.

The one aspect described above may include a plurality of dummy conductors. In a configuration in which the one aspect described above includes a plurality of dummy conductors, the plurality of dummy conductors may be disposed in the same layer as the plurality of internal electrodes to be located between each of the pair of side surfaces and the plurality of internal electrodes, for example. Each of the plurality of dummy conductors may be electrically connected to the external electrode to which the internal electrode located in the same layer is electrically connected, for example.

In a configuration in which the one aspect described above includes the plurality of dummy conductors, a configuration on one end surface side from a center in the second direction and a configuration on the other end surface side from the center in the second direction tend not to be different from each other. Therefore, structural defects tend not to occur in the element body.

A length of the dummy conductor from the reference plane in the second direction may be smaller than a length from the reference plane to the edge of the conductive resin layer to which the dummy conductor is not electrically connected.

In a configuration in which the length of the dummy conductor from the reference plane in the second direction is smaller than the length from the reference plane to the edge of the conductive resin layer to which the dummy conductor is not electrically connected, an electric field tends not to be generated between the dummy conductor and the conductive resin layer to which the dummy conductor is not electrically connected. Therefore, this configuration reliably controls occurrence of the migration.

Each of the plurality of external electrodes may include a pair of main surface electrode portions disposed on the main surface and including a conductive resin layer. An outermost internal electrode located on an outermost side in the first direction, among the plurality of internal electrodes, may include a first end exposed to the end surface and a second end opposing the first end in the second direction and located in the element body. When the outermost internal electrode and the conductive resin layer included in the main surface electrode portion to which the outermost internal electrode is electrically connected are viewed from the first direction, the second end may be exposed from the conductive resin layer included in the main surface electrode portion. When the outermost internal electrode and the conductive resin layer included in the main surface electrode portion to which the outermost internal electrode is not electrically connected are viewed from the first direction, the outermost internal electrode and the conductive resin layer included in the main surface electrode portion may do not overlap each other.

In a configuration in which the second end of the outermost internal electrode is exposed from the conductive resin layer included in the main surface electrode portion to which the outermost internal electrode is electrically connected when viewed from the first direction, the internal electrode adjacent to the outermost internal electrode in the first direction and the conductive resin layer included in the main surface electrode portion adjacent to the same outermost internal electrode in the first direction are not electrically connected to each other, but tend not to oppose each other in the first direction. An electric field tends not to be generated between the conductive resin layer and the internal electrode that are not electrically connected to each other.

In a configuration in which the outermost internal electrode and the conductive resin layer included in the main surface electrode portion to which the outermost internal electrode is not electrically connected do not overlap each other when viewed from the first direction, the outermost internal electrode tends not to oppose the conductive resin layer included in the main surface electrode portion, to which the outermost internal electrode is not electrically connected, in the first direction. An electric field tends not to be generated between the conductive resin layer and the outermost internal electrode that are not electrically connected to each other.

Consequently, even in a configuration in which the external electrode includes the main surface electrode portion including the conductive resin layer, the occurrence of migration is controlled.

The one aspect described above may include an internal conductor located in the same layer as the outermost internal electrode and separated from the outermost internal electrode. The internal conductor may be electrically connected to the external electrode to which the outermost internal electrode located in the same layer as the internal conductor is not electrically connected.

In a configuration in which the internal conductor is located in the same layer as the outermost internal electrode, structural defects tend not to occur in the element body.

The one aspect described above may include a pair of internal conductors. In a configuration in which the one aspect described above includes the pair of internal conductors, the pair of internal conductors may be disposed between a corresponding main surface of the pair of main surfaces and an outermost internal electrode located on an outermost side in the first direction, among the plurality of internal electrodes, to oppose the outermost internal electrode in the first direction. Each of the plurality of external electrodes may include a pair of main surface electrode portions disposed on the main surface and including a conductive resin layer, for example. Each of the pair of internal conductors may oppose the conductive resin layer included in the main surface electrode portion, to which the outermost internal electrode opposing the internal conductor in the first direction is not electrically connected, in the first direction, for example.

In a configuration in which the one aspect described above includes the pair of internal conductors, the internal conductor is located between the main surface electrode portion not electrically connected to the internal conductor and the outermost internal electrode not electrically connected to the main surface electrode portion, in the first direction. The internal conductor is located between the main surface electrode portion and the outermost internal electrode that are not electrically connected to each other, in the first direction. Therefore, the main surface electrode portion and the outermost internal electrode that are not electrically connected to each other tend not to directly oppose each other in the first direction. An electric field tends not to be generated between the conductive resin layer included in the main surface electrode portion and the outermost internal electrode that are not electrically connected to each other.

Consequently, even in a configuration in which the external electrode includes a main surface electrode portion including a conductive resin layer, the occurrence of migration is controlled.

The one aspect described above may include a pair of other internal conductors. In a configuration in which the one aspect described above includes the pair of other internal conductors, the pair of other internal conductors may be disposed in the same layer as a corresponding internal conductor of the pair of internal conductors, for example. Each of the pair of other internal conductors may oppose the conductive resin layer included in the main surface electrode portion, to which the outermost internal electrode opposing each of the other internal conductors in the first direction is not electrically connected, in the first direction, for example.

In a configuration in which the one aspect described above includes the pair of other internal conductors, a configuration on one end surface side from a center in the second direction and a configuration on the other end surface side from the center in the second direction tend not to be different from each other. Therefore, structural defects tend not to occur in the element body.

In the one aspect described above, when the internal electrode and the conductive resin layer included in the side surface electrode portion that are not electrically connected to each other are viewed from the third direction, the internal electrode and the conductive resin layer included in the side surface electrode portion may overlap each other.

In this case, a length of the internal electrode in the second direction increases, and then capacitance can be increased.

In the one aspect described above, the conductive resin layer may include a plurality of silver particles.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

DETAILED DESCRIPTION OF EMBODIMENTS

Figure 1:
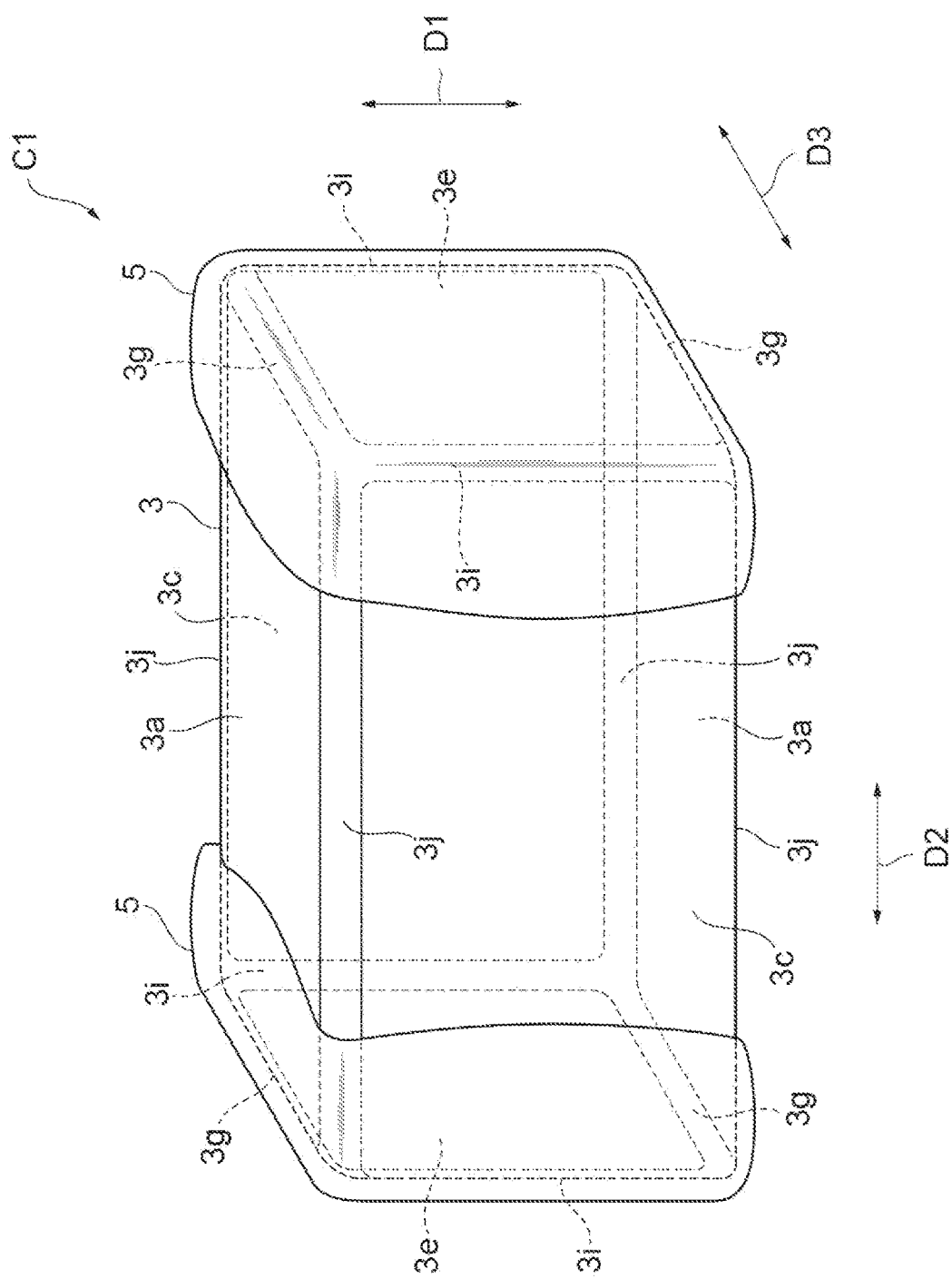
FIG. 1 is a perspective view of a multilayer capacitor according to a first embodiment.

Hereinafter, embodiments of the present invention will be described in detail with reference to the accompanying drawings. In the following description, the same elements or elements having the same functions are denoted with the same reference numerals and overlapped explanation is omitted.

First Embodiment

Figure 2:
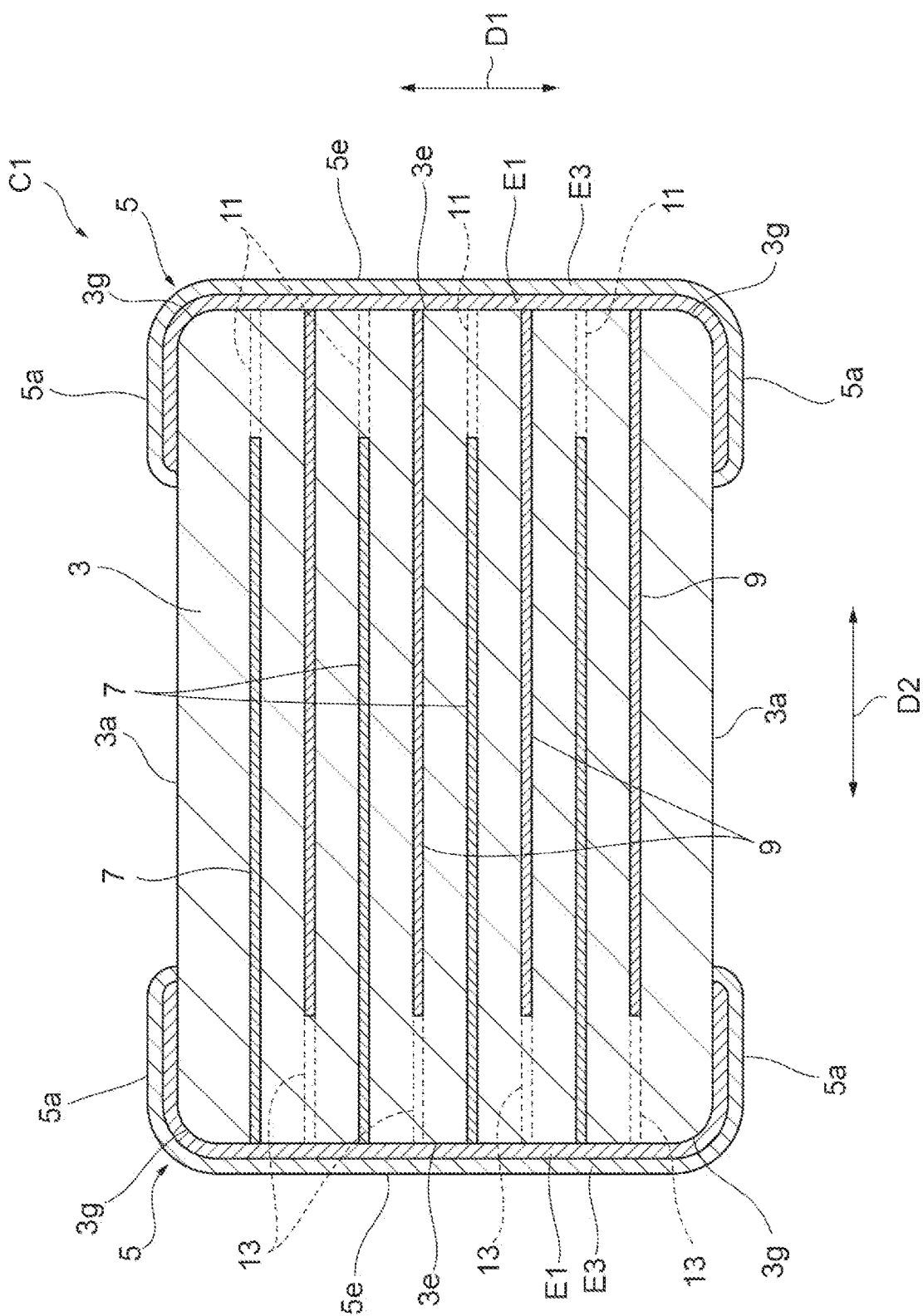
FIG. 2 is a view illustrating a cross-sectional configuration of the multilayer capacitor according to the first embodiment.
Figure 3:
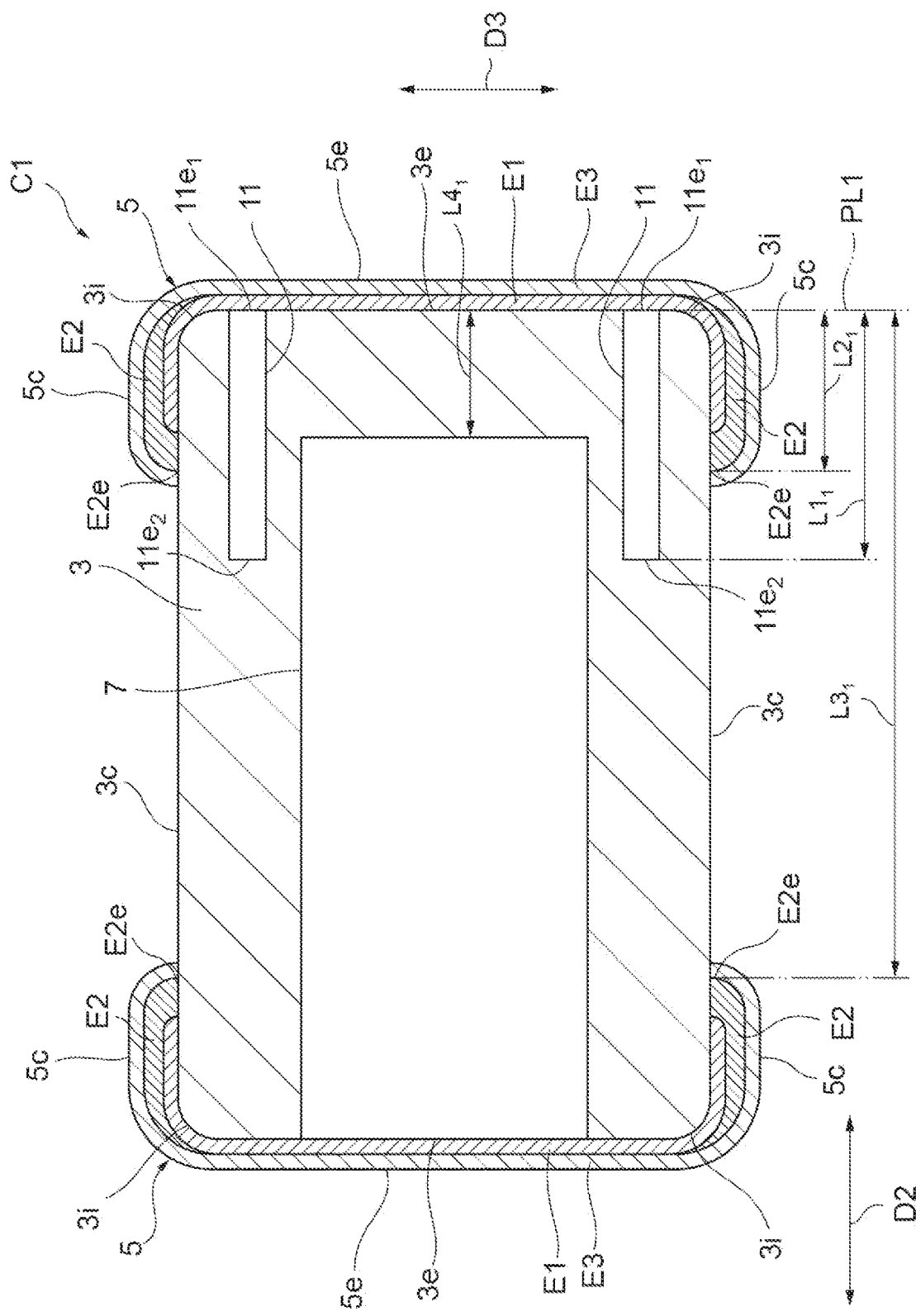
FIG. 3 is a view illustrating a cross-sectional configuration of the multilayer capacitor according to the first embodiment.
Figure 4:
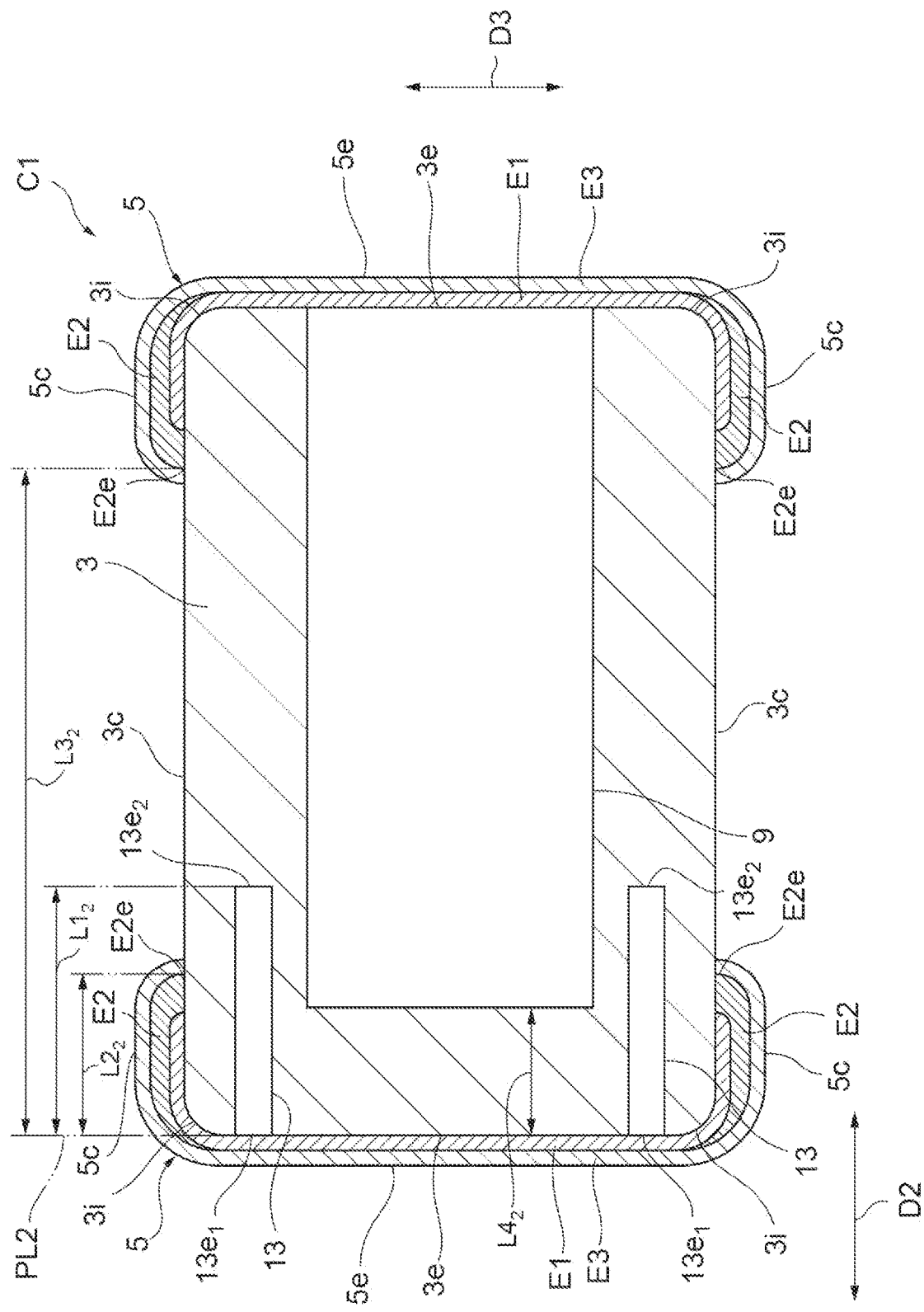
FIG. 4 is a view illustrating a cross-sectional configuration of the multilayer capacitor according to the first embodiment.

A configuration of a multilayer capacitor C1 according to a first embodiment will be described with reference to FIGS. 1 to 4. FIG. 1 is a perspective view of a multilayer capacitor according to the first embodiment. FIGS. 2, 3, and 4 are views illustrating a cross-sectional configuration of the multilayer capacitor according to the first embodiment. In the present embodiment, an electronic component includes, for example, the multilayer capacitor C1.

As illustrated in FIG. 1, the multilayer capacitor C1 includes an element body 3 of a rectangular parallelepiped shape and a plurality of external electrodes 5. In the present embodiment, the multilayer capacitor C1 includes a pair of external electrodes 5. The pair of external electrodes 5 are disposed on an outer surface of the element body 3. The pair of external electrodes 5 are separated from each other. The rectangular parallelepiped shape includes a rectangular parallelepiped shape in which corners and ridges are chamfered, or a rectangular parallelepiped shape in which the corners and ridges are rounded.

The element body 3 includes a pair of main surfaces 3a opposing each other, a pair of side surfaces 3c opposing each other, and a pair of end surfaces 3e opposing each other. The pair of main surfaces 3a, the pair of side surfaces 3c, and the pair of end surfaces 3e each have a substantially rectangular shape. The pair of main surfaces 3a oppose each other in a first direction D1. The pair of side surfaces 3c oppose each other in a third direction D3. The pair of end surfaces 3e oppose each other in a second direction D2. The multilayer capacitor C1 is solder-mounted on an electronic device. The electronic device includes, for example, a circuit board or an electronic component. In the multilayer capacitor C1, one main surfaces 3a opposes the electronic device. The one main surfaces 3a is arranged to constitute a mounting surface. The one main surfaces 3a is the mounting surface.

The first direction D1 is a direction orthogonal to each main surfaces 3a, and is orthogonal to the third direction D3. The second direction D2 is a direction parallel to each main surfaces 3a and each side surface 3c, and is orthogonal to the first direction D1 and the third direction D3. The third direction D3 is a direction orthogonal to each side surface 3c, and the second direction D2 is a direction orthogonal to each end surface 3e. In the present embodiment, a length of the element body 3 in the second direction D2 is larger than a length of the element body 3 in the first direction D1 and larger than a length of the element body 3 in the third direction D3. The second direction D2 is a longitudinal direction of the element body 3. The length of the element body 3 in the first direction D1 and the length of the element body 3 in the third direction D3 may be equal to each other. The length of the element body 3 in the first direction D1 and the length of the element body 3 in the third direction D3 may be different.

The length of the element body 3 in the first direction D1 is a height of the element body 3. The length of the element body 3 in the third direction D3 is a width of the element body 3. The length of the element body 3 in the second direction D2 is a length of the element body 3. In the present embodiment, the height of the element body 3 is 0.1 to 2.5 mm, the width of the element body 3 is 0.1 to 5.0 mm, and the length of the element body 3 is 0.2 to 5.7 mm. For example, the height of the element body 3 is 2.5 mm, the width of the element body 3 is 2.5 mm, and the length of the element body 3 is 3.2 mm.

The pair of side surfaces 3c extend in the first direction D1 to couple the pair of main surfaces 3a to each other. The pair of side surfaces 3c also extend in the second direction D2. The pair of end surfaces 3e extend in the first direction D1 to couple the pair of main surfaces 3a to each other. The pair of end surfaces 3e also extend in the third direction D3.

The element body 3 includes four ridge portions 3g, four ridge portions 3i, and four ridge portions 3j. The ridge portion 3g is located between the end surface 3e and the main surfaces 3a. The ridge portion 3i is located between the end surface 3e and the side surface 3c. The ridge portion 3j is located between the main surfaces 3a and the side surface 3c. In the present embodiment, the ridge portions 3g, 3i, and 3j are rounded to be curved. The element body 3 is subjected to what is called a round chamfering process. The end surface 3e and the main surfaces 3a are indirectly adjacent to each other with the ridge portion 3g interposed therebetween. The end surface 3e and the side surface 3c are indirectly adjacent to each other with the ridge portion 3i interposed therebetween. The main surfaces 3a and the side surface 3c are indirectly adjacent to each other with the ridge portion 3j interposed therebetween.

The element body 3 is configured through laminating a plurality of dielectric layers in the first direction D1. The element body 3 includes a plurality of laminated dielectric layers. In the element body 3, a lamination direction of the plurality of dielectric layers coincides with the first direction D1. Each dielectric layer includes, for example, a sintered element body of a ceramic green sheet containing a dielectric material. Examples of the dielectric material include dielectric ceramics. Examples of the dielectric ceramics include $BaTiO_3$-based, $Ba(Ti, Zr)O_3$-based, or $(Ba, Ca)TiO_3$-based dielectric ceramics. In the actual element body 3, each of the dielectric layers is integrated to such an extent that a boundary between the dielectric layers cannot be visually recognized.

As illustrated in FIGS. 2 to 4, the multilayer capacitor C1 includes a plurality of internal electrodes 7 and a plurality of internal electrodes 9. Each of the internal electrodes 7 and 9 is an internal conductor disposed in the element body 3. Each of the internal electrodes 7 and 9 is made of an electrically conductive material that is commonly used as an internal conductor of a multilayer electronic component. The electrically conductive material includes, for example, a base metal. The electrically conductive material includes, for example, Ni or Cu. Each of the internal electrodes 7 and 9 is configured as a sintered body of electrically conductive paste containing the electrically conductive material described above. In the present embodiment, the internal electrodes 7 and 9 are made of Ni.

The internal electrodes 7 and the internal electrodes 9 are disposed in different positions (layers) in the first direction D1. The internal electrodes 7 and the internal electrodes 9 are alternately disposed in the element body 3 to oppose each other in the first direction D1 with an interval therebetween. The internal electrodes 7 and the internal electrodes 9 have different polarities from each other. One end of each of the internal electrodes 7 and 9 is exposed to a corresponding end surface 3e of the pair of end surfaces 3e. Each of the internal electrodes 7 and 9 includes the one end exposed to the corresponding end surface 3e.

The plurality of internal electrodes 7 and the plurality of internal electrodes 9 are alternately disposed in the first direction D1. The plurality of internal electrodes 7 and the plurality of internal electrodes 9 are disposed in the element body 3 to be distributed in the first direction D1. Each of the plurality of internal electrodes 7 and the plurality of internal electrodes 9 is located in a plane approximately parallel to the main surfaces 3a. The internal electrode 7 and the internal electrode 9 oppose each other in the first direction D1. The direction (first direction D1) in which the internal electrode 7 and the internal electrode 9 oppose each other is orthogonal to a direction parallel to the main surfaces 3a (second direction D2 and third direction D3).

As illustrated in FIG. 1, the external electrodes 5 are disposed at both ends of the element body 3 in the second direction D2. Each external electrode 5 is disposed on the corresponding end surface 3e side of the element body 3. In the present embodiment, each external electrode 5 is element on the pair of main surfaces 3a, the pair of side surfaces 3c, and the end surface 3e. The external electrode 5 includes a plurality of electrode portions 5a, 5c, and 5e as illustrated in FIGS. 2 to 4. The electrode portion 5a is disposed on the main surfaces 3a and on the ridge portion 3g. Each electrode portion 5c is disposed on the side surface 3c and on the ridge portion 3i. The electrode portion 5e is disposed on the end surface 3e. The external electrode 5 also includes an electrode portion disposed on the ridge portion 3j.

The external electrodes 5 are formed on the five surfaces of the pair of main surfaces 3a, the end surface 3e, and the pair of side surfaces 3c and the ridge portions 3g, 3i, and 3j. The electrode portions 5a, 5c, and 5e adjacent to each other are coupled and are electrically connected to each other. The electrode portion 5e covers all the one ends of corresponding internal electrodes 7 and 9 of the plurality of internal electrodes 7 and 9. The electrode portion 5e is directly connected to the corresponding internal electrodes 7 and 9. The external electrode 5 is electrically connected to the corresponding internal electrodes 7 and 9. As illustrated in FIGS. 2 to 4, the external electrode 5 includes a first electrode layer E1, a second electrode layer E2, and a third electrode layer E3. The third electrode layer E3 is arranged to constitute the outermost layer of the external electrode 5. Each of the electrode portions 5a and 5e includes the first electrode layer E1 and the third electrode layer E3. Each electrode portion 5c includes the first electrode layer E1, the second electrode layer E2, and the third electrode layer E3.

The first electrode layer E1 of the electrode portion 5a is disposed on the main surfaces 3a and the ridge portion 3g. The first electrode layer E1 of the electrode portion 5a is formed to cover one part of the main surfaces 3a and the entire ridge portion 3g. The first electrode layer E1 of the electrode portion 5a is in contact with the above-described one part of the main surfaces 3a and the entire ridge portion 3g. In the electrode portion 5a, the first electrode layer E1 is in direct contact with the element body 3. The main surfaces 3a is covered with the first electrode layer E1 at the above-described one part, and is exposed from the first electrode layer E1 at the remaining part except the above-described one part. The above-described one part of the main surfaces 3a is a partial region near the end surface 3e, in the main surfaces 3a. The first electrode layer E1 of the electrode portion 5a is located on the main surfaces 3a. The first electrode layer E1 may not be formed on the main surfaces 3a. The first electrode layer E1 may not be disposed on the main surfaces 3a.

The third electrode layer E3 of the electrode portion 5a is disposed on the first electrode layer E1. In the electrode portion 5a, the third electrode layer E3 covers the entire first electrode layer E1. In the electrode portion 5a, the third electrode layer E3 is in contact with the entire first electrode layer E1. In the electrode portion 5a, the third electrode layer E3 is in direct contact with the first electrode layer E1. The third electrode layer E3 of the electrode portion 5a is located on the main surfaces 3a.

The electrode portion 5a is two-layered. A one part of the electrode portion 5a constitutes, for example, a main surface electrode portion. The above-described one part of the electrode portion 5a is, for example, a portion included in the electrode portion 5a and located on the main surface 3a.

The first electrode layer E1 of the electrode portion 5c is disposed on the side surface 3c and the ridge portion 3i. The first electrode layer E1 of the electrode portion 5c is formed to cover one part of the side surface 3c and the entire ridge portion 3i. The first electrode layer E1 of the electrode portion 5c is in contact with the above-described one part of the side surface 3c and the entire ridge portion 3i. In the electrode portion 5c, the first electrode layer E1 is in direct contact with the element body 3. The side surface 3c is covered with the first electrode layer E1 at the above-described one part, and is exposed from the first electrode layer E1 at the remaining part except the above-described one part. The above-described one part of the side surface 3c is a partial region near the end surface 3e, in the side surface 3c. The first electrode layer E1 of the electrode portion 5c is located on the side surface 3c. The first electrode layer E1 may not be formed on the side surface 3c. The first electrode layer E1 may not be disposed on the side surface 3c.

The second electrode layer E2 of the electrode portion 5c is disposed on the first electrode layer E1 and on the side surface 3c. In the electrode portion 5c, the second electrode layer E2 is formed to cover the first electrode layer E1 and a part of the side surface 3c. In the electrode portion 5c, the second electrode layer E2 is in direct contact with the first electrode layer E1 and the side surface 3c. The second electrode layer E2 of the electrode portion 5c is formed to cover the entire first electrode layer E1 of the electrode portion 5c. In the electrode portion 5c, the second electrode layer E2 indirectly covers the side surface 3c in such a manner that the first electrode layer E1 is located between the second electrode layer E2 and the side surface 3c. The second electrode layer E2 of the electrode portion 5c is located on the side surface 3c. Each second electrode layer E2 located on the same side surface 3c includes an edge E2e. On the same side surface 3c, an edge E2e of one second electrode layer E2 opposes an edge E2e of the other second electrode layer E2.

The third electrode layer E3 of the electrode portion 5c is disposed on the second electrode layer E2. In the electrode portion 5c, the third electrode layer E3 covers the entire second electrode layer E2. In the electrode portion 5c, the third electrode layer E3 is in contact with the entire second electrode layer E2. In the electrode portion 5c, the third electrode layer E3 is in direct contact with the second electrode layer E2. In the electrode portion 5c, the third electrode layer E3 is not in direct contact with the first electrode layer E1. The third electrode layer E3 of the electrode portion 5c is located on the side surface 3c.

The electrode portion 5c is three-layered. A one part of the electrode portion 5c constitutes, for example, a side surface electrode portion. The above-described one part of the electrode portion 5c is, for example, a portion included in the electrode portion 5c and located on the side surface 3c. In the above-described one part of the electrode portion 5c, the second electrode layer E2 is in direct contact with the side surface 3c.

The first electrode layer E1 of the electrode portion 5e is disposed on the end surface 3e. The first electrode layer E1 of the electrode portion 5e is formed to cover the entire end surface 3e. The first electrode layer E1 of the electrode portion 5e is in contact with the entire end surface 3e. In the electrode portion 5e, the first electrode layer E1 is in direct contact with the end surface 3e.

The third electrode layer E3 of the electrode portion 5e is disposed on the first electrode layer E1. In the electrode portion 5e, the third electrode layer E3 covers the entire first electrode layer E1. In the electrode portion 5e, the third electrode layer E3 is in contact with the entire first electrode layer E1. In the electrode portion 5e, the third electrode layer E3 is in direct contact with the first electrode layer E1. The third electrode layer E3 of the electrode portion 5e is located on the end surface 3e.

The electrode portion 5e is two-layered. The electrode portion 5e constitutes, for example, a end surface electrode portion.

The first electrode layer E1 is formed from sintering electrically conductive paste applied onto the surface of the element body 3. The first electrode layer E1 is formed to cover the above-described one part of the main surfaces 3a, the above-described one part of the side surface 3c, the end surface 3e, and the ridge portions 3g, 3i, and 3j. The first electrode layer E1 is formed from sintering a metal component contained in the electrically conductive paste. The metal component contained in the electrically conductive paste includes, for example, a metal particle. The first electrode layer E1 includes a sintered metal layer. The first electrode layer E1 includes a sintered metal layer formed on the element body 3. In the present embodiment, the first electrode layer E1 includes a sintered metal layer made of Cu. The first electrode layer E1 may include a sintered metal layer made of Ni. The first electrode layer E1 contains a base metal. The electrically conductive paste contains, for example, particles formed of Cu or Ni, a glass component, an organic binder, and an organic solvent. The first electrode layer E1 included in each of the electrode portions 5a, 5c, and 5e is integrally formed.

The second electrode layer E2 is formed from curing electrically conductive resin applied onto the first electrode layer E1 and the element body 3. The second electrode layer E2 is formed on the first electrode layer E1 and the element body 3. The first electrode layer E1 is an underlying metal layer for forming the second electrode layer E2. The second electrode layer E2 is an electrically conductive resin layer that covers the first electrode layer E1. The conductive resin contains, for example, a resin, an electrically conductive material, and an organic solvent. The resin includes, for example, a thermosetting resin. The conductive material includes, for example, metal particles. Metal particles include, for example, silver particles or copper particles. In the present embodiment, the second electrode layer E2 includes a plurality of silver particles. The second electrode layer E2 includes a plurality of metal particles. The thermosetting resin is, for example, a phenol resin, an acrylic resin, a silicone resin, an epoxy resin, or a polyimide resin. The second electrode layer E2 is in contact with a part of the ridge portion 3j. The second electrode layer E2 is in contact with a part of the ridge portion 3j.

The third electrode layer E3 is formed on the second electrode layer E2 and on the first electrode layer E1 (a portion exposed from the second electrode layer E2) through a plating method. The third electrode layer E3 may have a multilayer structure. In this case, the third electrode layer E3 includes, for example, an Ni plating layer and a solder plating layer. The Ni plating layer is formed on the second electrode layer E2 and on the first electrode layer E1. The solder plating layer is formed on the Ni plating layer. The solder plating layer covers the Ni plating layer. The Ni plating layer has better solder leach resistance than the metal contained in the second electrode layer E2. The third electrode layer E3 may include an Sn plating layer, a Cu plating layer, or an Au plating layer instead of the Ni plating layer. The solder plating layer includes, for example, an Sn plating layer, an Sn—Ag alloy plating layer, an Sn—Bi alloy plating layer, or an Sn—Cu alloy plating layer. The third electrode layer E3 included in each of the electrode portions 5a, 5c, and 5e is integrally formed.

The electrode portion 5a does not include the second electrode layer E2. The electrode portion 5c includes the second electrode layer E2. For example, in a case where the electrode portion 5c constitutes a first electrode portion, the electrode portion 5a constitutes a second electrode portion and the electrode portion 5e constitutes a third electrode portion. In the present embodiment, the electrode portion 5e does not include the second electrode layer E2.

As illustrated in FIGS. 2 to 4, the multilayer capacitor C1 includes a plurality of auxiliary internal electrodes 11 and a plurality of auxiliary internal electrodes 13. Each of the auxiliary internal electrodes 11 and 13 is an internal conductor disposed in the element body 3. Similar to the internal electrodes 7 and 9, the auxiliary internal electrodes 11 and 13 are made of an electrically conductive material that is commonly used as an internal conductor of a multilayer electronic component. The electrically conductive material includes, for example, a base metal.

The electrically conductive material includes, for example, Ni or Cu. Each of the auxiliary internal electrodes 11 and 13 is configured as a sintered body of an electrically conductive paste containing the electrically conductive material described above. In the present embodiment, the auxiliary internal electrodes 11 and 13 are made of Ni.

As illustrated in FIG. 3, each of the plurality of auxiliary internal electrodes 11 is disposed in the same layer as the corresponding internal electrode 7 of the plurality of internal electrodes 7. Each of the plurality of auxiliary internal electrodes 11 is disposed between the corresponding internal electrodes 7 and the side surface 3c. In the present embodiment, one internal electrode 7 and two auxiliary internal electrodes 11 are located in the same layer. One internal electrode 7 and two auxiliary internal electrodes 11 are disposed at the same position in the first direction D1. The internal electrode 7 and the auxiliary internal electrode 11 disposed in the same layer are separated from each other in the third direction D3. The auxiliary internal electrode 11 is separated from the side surface 3c, and is not exposed to the side surface 3c.

The auxiliary internal electrode 11 includes a pair of ends $11e_1$ and $11e_2$ opposing each other in the second direction D2. The end $11e_1$ is exposed to the corresponding end surface 3e of the pair of end surfaces 3e. The end $11e_2$ is located within the element body 3. The end surface 3e to which the end $11e_1$ is exposed and the end surface 3e to which one end of the internal electrode 7 is exposed are different from each other. The one end of the internal electrode 7 is not exposed to the end surface 3e to which the end $11e_1$ is exposed.

Each auxiliary internal electrode 11 is directly connected to the electrode portion 5e included in a corresponding external electrode 5 of the pair of external electrodes 5. The end $11e_1$ is directly connected to the electrode portion 5e included in the corresponding external electrode 5. Each auxiliary internal electrode 11 is electrically connected to the electrode portion 5e included in the corresponding external electrode 5. The electrode portion 5e to which the auxiliary internal electrode 11 is electrically connected and the electrode portion 5e to which the internal electrode 7 is electrically connected are different from each other. The internal electrode 7 is not electrically connected to the electrode portion 5e to which the auxiliary internal electrode 11 is electrically connected.

The auxiliary internal electrode 11 is located between the internal electrode 7 located in the same layer as the auxiliary internal electrode 11 and a corresponding side surface 3c of the pair of side surface 3c. The auxiliary internal electrode 11 is located between the internal electrode 7 located in the same layer as the auxiliary internal electrode 11 and the electrode portion 5c located on the corresponding side surface 3c. The auxiliary internal electrode 11 is located between the second electrode layer E2 to which the internal electrode 7 located in the same layer as the auxiliary internal electrode 11 is not electrically connected and the internal electrode 7 located in the same layer as the auxiliary internal electrode 11. The internal electrode 7 is located between the pair of auxiliary internal electrodes 11 that are located in the same layer as the internal electrode 7, in the third direction D3.

A length $L1_1$ of the auxiliary internal electrode 11 from the reference plane PL1 in the second direction D2 is larger than a length $L2_1$ in the second direction D2 from the reference plane PL1 to the edge E2e of the second electrode layer E2 electrically connected to the auxiliary internal electrode 11. Therefore, when the auxiliary internal electrode 11 and the second electrode layer E2 to which the auxiliary internal electrode 11 is electrically connected are viewed from the third direction D3, the end 11e2 is exposed from the second electrode layer E2 to which the auxiliary internal electrode 11 is electrically connected.

The length $L1_1$ is smaller than a length L31 in the second direction D2 from the reference plane PL1 to the edge E2e of the second electrode layer E2 to which the auxiliary internal electrode 11 is not electrically connected. Therefore, when the auxiliary internal electrode 11 and the second electrode layer E2 to which the auxiliary internal electrode 11 is not electrically connected are viewed from the third direction D3, the auxiliary internal electrode 11 and the second electrode layer E2 to which the auxiliary internal electrode 11 is not electrically connected do not overlap each other.

The reference plane PL1 includes the end surface 3e to which the end $11e_1$ is exposed. For example, when the length $L1_1$ constitutes a first length, the length $L2_1$ constitutes a second length and the length $L3_1$ constitutes a third length.

A length $L4_1$ from the reference plane PL1 to the other end of the internal electrode 7 in the second direction D2 is smaller than the length $L2_1$. Therefore, when the internal electrode 7 that is not electrically connected to the auxiliary internal electrode 11 and the second electrode layer E2 to which the auxiliary internal electrode 11 is electrically connected are viewed from the third direction D3, the internal electrode 7 and the second electrode layer E2 to which the auxiliary internal electrode 11 is electrically connected overlap each other. The length $L1_1$ is larger than the length $L4_1$. Therefore, when the internal electrode 7 and the auxiliary internal electrode 11 located in the same layer are viewed from the third direction D3, the internal electrode 7 and the auxiliary internal electrode 11 overlap each other. In this case, the internal electrode 7 and the auxiliary internal electrode 11 located in the same layer can contribute to generation of capacitance. The length $L1_1$ may be smaller than the length $L4_1$.

As illustrated in FIG. 4, each of the plurality of auxiliary internal electrodes 13 is disposed in the same layer as the corresponding internal electrode 9 of the plurality of internal electrodes 9. Each of the plurality of auxiliary internal electrodes 13 is disposed between the corresponding internal electrodes 9 and the side surface 3c. In the present embodiment, one internal electrode 9 and two auxiliary internal electrodes 13 are located in the same layer. One internal electrode 9 and two auxiliary internal electrodes 13 are disposed at the same position in the first direction D1. The internal electrode 9 and the auxiliary internal electrode 13 disposed in the same layer are separated from each other in the third direction D3. The auxiliary internal electrode 13 is separated from the side surface 3c, and is not exposed to the side surface 3c.

The auxiliary internal electrode 13 includes a pair of ends $13e_1$ and $13e_2$ opposing each other in the second direction D2. The end $13e_1$ is exposed to the corresponding end surface 3e of the pair of end surfaces 3e. The end surface 3e to which the end $13e_1$ is exposed is different from the end surface 3e to which the end $11e_1$ is exposed. The end $13e_2$ is located within the element body 3. The end surface 3e to which the end $13e_1$ is exposed and the end surface 3e to which one end of the internal electrode 9 is exposed are different from each other. The one end of the internal electrode 9 is not exposed to the end surface 3e to which the end $13e_1$ is exposed.

Each auxiliary internal electrode 13 is directly connected to the electrode portion 5e included in a corresponding external electrode 5 of the pair of external electrodes 5. The end $13e_1$ is directly connected to the electrode portion 5e included in the corresponding external electrode 5. Each auxiliary internal electrode 13 is electrically connected to the electrode portion 5e included in the corresponding external electrode 5. The electrode portion 5e to which the auxiliary internal electrode 13 is electrically connected and the electrode portion 5e to which the internal electrode 9 is electrically connected are different from each other. The internal electrode 9 is not electrically connected to the electrode portion 5e to which the auxiliary internal electrode 13 is electrically connected.

The auxiliary internal electrode 13 is located between the internal electrode 9 located in the same layer as the auxiliary internal electrode 13 and a corresponding side surface 3c of the pair of side surface 3c. The auxiliary internal electrode 13 is located between the internal electrode 9 located in the same layer as the auxiliary internal electrode 13 and the electrode portion 5c located on the corresponding side surface 3c. The auxiliary internal electrode 13 is located between the second electrode layer E2 to which the internal electrode 9 located in the same layer as the auxiliary internal electrode 13 is not electrically connected and the internal electrode 9 located in the same layer as the auxiliary internal electrode 13. The internal electrode 9 is located between the pair of auxiliary internal electrodes 13 that are located in the same layer as the internal electrode 9, in the third direction D3.

A length $L1_2$ of the auxiliary internal electrode 13 from the reference plane PL2 in the second direction D2 is larger than a length $L2_2$ in the second direction D2 from the reference plane PL2 to the edge E2e of the second electrode layer E2 electrically connected to the auxiliary internal electrode 13. Therefore, when the auxiliary internal electrode 13 and the second electrode layer E2 to which the auxiliary internal electrode 13 is electrically connected are viewed from the third direction D3, the end $13e_2$ is exposed from the second electrode layer E2 to which the auxiliary internal electrode 13 is electrically connected.

The length $L1_2$ is smaller than a length $L3_2$ in the second direction D2 from the reference plane PL2 to the edge E2e of the second electrode layer E2 to which the auxiliary internal electrode 13 is not electrically connected. Therefore, when the auxiliary internal electrode 13 and the second electrode layer E2 to which the auxiliary internal electrode 13 is not electrically connected are viewed from the third direction D3, the auxiliary internal electrode 13 and the second electrode layer E2 to which the auxiliary internal electrode 13 is not electrically connected do not overlap each other.

The reference plane PL2 includes the end surface 3e to which the end $13e_1$ is exposed. For example, when the length $L1_1$ constitutes a first length, the length $L2_1$ constitutes a second length and the length $L3_1$ constitutes a third length.

A length $L4_2$ from the reference plane PL2 to the other end of the internal electrode 9 in the second direction D2 is smaller than the length $L2_2$. Therefore, when the internal electrode 9 that is not electrically connected to the auxiliary internal electrode 13 and the second electrode layer E2 to which the auxiliary internal electrode 13 is electrically connected are viewed from the third direction D3, the internal electrode 9 and the second electrode layer E2 to which the auxiliary internal electrode 13 is electrically connected overlap each other. The length $L1_2$ is larger than the length $L4_2$. Therefore, when the internal electrode 9 and the auxiliary internal electrode 13 located in the same layer are viewed from the third direction D3, the internal electrode 9 and the auxiliary internal electrode 13 overlap each other. In this case, the internal electrode 9 and the auxiliary internal electrode 13 located in the same layer can contribute to generation of capacitance. The length $L1_2$ may be smaller than the length $L4_2$.

The length $L1_1$ and the length $L1_2$ may be equal or different. The length $L2_1$ and the length $L2_2$ may be equal or different. The length $L3_1$ and the length $L3_2$ may be equal or different. The length $L4_1$ and the length $L4_2$ may be equal or different.

When the multilayer capacitor C1 is solder-mounted on an electronic device, an external force acting on the multilayer capacitor C1 from the electronic device may act on the element body 3 through the electrode portion 5c. The external force is transmitted to the electrode portion 5c from the solder fillet formed in solder-mounting. The electronic device includes, for example, a circuit board or an electronic component.

In the multilayer capacitor C1, the electrode portion 5c includes the second electrode layer E2. Therefore, the external force tends not to act on the element body 3 from the electrode portion 5c. Consequently, the multilayer capacitor C1 controls occurrence of cracks in the element body 3.

In the multilayer capacitor C1, the auxiliary internal electrode 11 is located between the electrode portion 5c electrically connected to the auxiliary internal electrode 11 and the internal electrode 7. The internal electrode 7 is not electrically connected to the electrode portion 5c electrically connected to the auxiliary internal electrode 11. The auxiliary internal electrode 13 is located between the electrode portion 5c electrically connected to the auxiliary internal electrode 13 and the internal electrode 9. The internal electrode 9 is not electrically connected to the electrode portion 5c electrically connected to the auxiliary internal electrode 13.

The auxiliary internal electrode 11 is located between the electrode portion 5c and the internal electrode 7 that are not electrically connected to each other. The auxiliary internal electrode 13 is located between the electrode portion 5c and the internal electrode 9 that are not electrically connected to each other. Therefore, the electrode portion 5c and the internal electrode 7 that are not electrically connected to each other tend not to directly oppose each other in the third direction D3. An electric field tends not to be generated between the second electrode layer E2 included in the electrode portion 5c and the internal electrode 7 that are not electrically connected to each other. The electrode portion 5c and the internal electrode 9 that are not electrically connected to each other also tend not to directly oppose each other in the third direction D3. An electric field tends not to be generated between the second electrode layer E2 included in the electrode portion 5c and the internal electrode 9 that are not electrically connected to each other.

Consequently, the multilayer capacitor C1 controls occurrence of migration.

In the multilayer capacitor C1, the lengths $L1_1$ and $L1_2$ are larger than the lengths $L2_1$ and $L2_2$, and the lengths $L1_1$ and $L1_2$ are smaller than the lengths $L3_1$ and $L3_2$.

In a configuration in which the length $L1_1$ is larger than the length $L2_1$, the electrode portion 5c and the internal electrode 7 that are not electrically connected to each other tend not to reliably and directly oppose each other in the third direction D3. An electric field further tends not to be generated between the second electrode layer E2 included in the electrode portion 5c and the internal electrode 7 that are not electrically connected to each other. In a configuration in which the length $L1_2$ is larger than the length $L2_2$, the electrode portion 5c and the internal electrode 9 that are not electrically connected to each other tend not to reliably and directly oppose each other in the third direction D3. An electric field further tends not to be generated between the second electrode layer E2 included in the electrode portion 5c and the internal electrode 9 that are not electrically connected to each other.

In a configuration in which the length $L1_1$ is smaller than the length $L3_1$, the auxiliary internal electrode 11 tends not to oppose the electrode portion 5c, to which the auxiliary internal electrode 11 is not electrically connected, in the third direction D3. An electric field tends not to be generated between the second electrode layer E2 included in the electrode portion 5c and the auxiliary internal electrode 11 that are not electrically connected to each other. In a configuration in which the length $L1_2$ is smaller than the length L32, the auxiliary internal electrode 13 tends not to oppose the electrode portion 5c, to which the auxiliary internal electrode 13 is not electrically connected, in the third direction D3. An electric field tends not to be generated between the second electrode layer E2 included in the electrode portion 5c and the auxiliary internal electrode 13 that are not electrically connected to each other.

Consequently, the multilayer capacitor C1 further controls the occurrence of the migration.

In the multilayer capacitor C1, when the internal electrode 7 and the second electrode layer E2 to which the auxiliary internal electrode 11 is electrically connected are viewed from the third direction D3, the internal electrode 7 and the second electrode layer E2 to which the auxiliary internal electrode 11 is electrically connected overlap each other. When the internal electrode 9 and the second electrode layer E2 to which the auxiliary internal electrode 13 is electrically connected are viewed from the third direction D3, the internal electrode 9 and the second electrode layer E2 to which the auxiliary internal electrode 13 is electrically connected overlap each other.

In this case, lengths of the internal electrodes 7 and 9 in the second direction D2 increase, and then capacitance of the multilayer capacitor C1 can be increased.

The second electrode layer E2 includes the plurality of silver particles. Silver particles tend to cause migration as compared with, for example, copper particles.

The multilayer capacitor C1 reliably controls the occurrence of the migration even when the second electrode layer E2 includes the plurality of silver particles.

Figure 5:
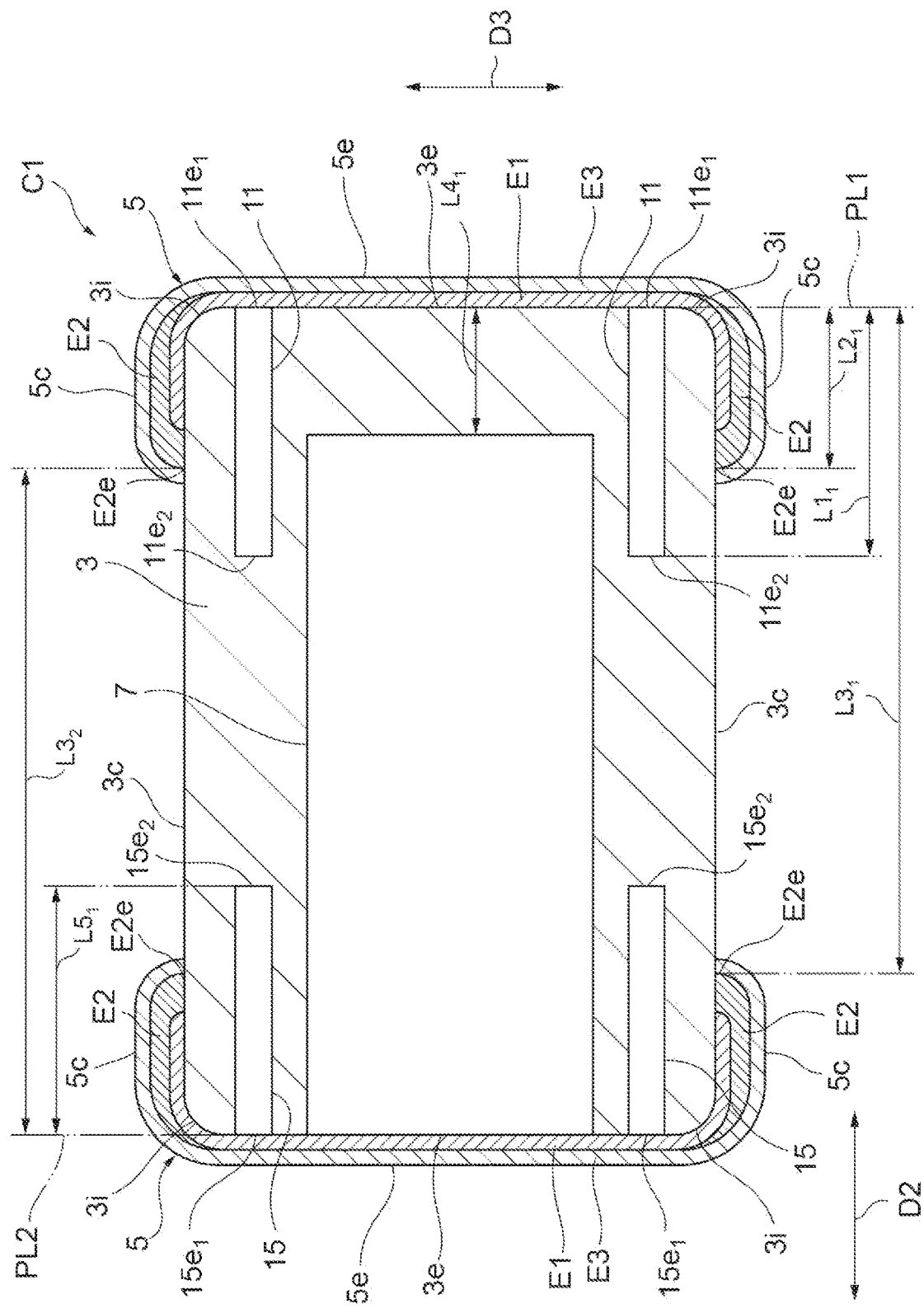
FIG. 5 is a view illustrating a cross-sectional configuration of a multilayer capacitor according to a modification of the first embodiment.
Figure 6:
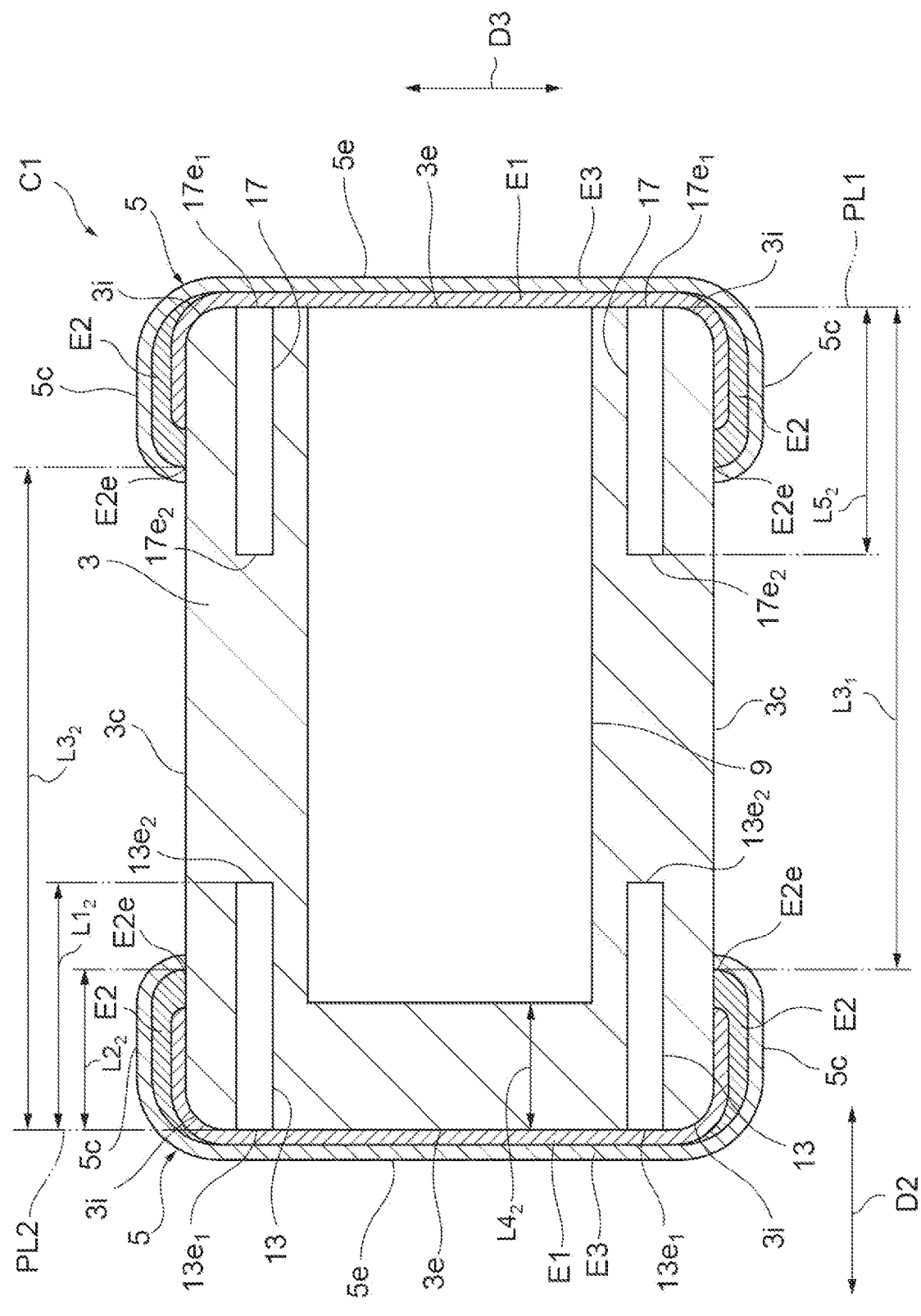
FIG. 6 is a view illustrating a cross-sectional configuration of a multilayer capacitor according to the modification of the first embodiment.

Next, a configuration of a multilayer capacitor according to a modification of the first embodiment will be described with reference to FIGS. 5 and 6. FIGS. 5 and 6 are views illustrating a cross-sectional configuration of a multilayer capacitor according to the modification of the first embodiment. The multilayer capacitor according to this modification is generally similar to or the same as the multilayer capacitor C1 described above. However, this modification is different from the above-described first embodiment in a configuration of a conductor disposed in the element body 3. Hereinafter, differences between the above-described first embodiment and this modification will be mainly described.

As illustrated in FIGS. 5 and 6, the multilayer capacitor C1 includes a plurality of conductors 15 and a plurality of conductors 17. Each of the conductors 15 and 17 is an internal conductor disposed in the element body 3. Similar to the internal electrodes 7 and 9, the conductors 15 and 17 are made of an electrically conductive material that is commonly used as an internal conductor of a multilayer electronic component. The electrically conductive material includes, for example, a base metal. The electrically conductive material includes, for example, Ni or Cu. Each of the conductors 15 and 17 is configured as a sintered body of electrically conductive paste containing the electrically conductive material described above. In the present embodiment, the conductors 15 and 17 are made of Ni.

As illustrated in FIG. 5, each of the plurality of conductors 15 is disposed in the same layer as a corresponding internal electrode 7 of the plurality of internal electrodes 7. Each of the plurality of conductors 15 is disposed between the corresponding internal electrodes 7 and the side surface 3c. In this modification, one internal electrode 7, two auxiliary internal electrodes 11, and two conductors 15 are located in the same layer. One internal electrode 7, two auxiliary internal electrodes 11, and two conductors 15 are disposed at the same position in the first direction D1. The internal electrode 7 and the conductor 15 disposed in the same layer are separated from each other in the third direction D3. The conductor 15 is separated from the side surface 3c, and is not exposed to the side surface 3c. The auxiliary internal electrode 11 and the conductor 15 disposed in the same layer and located between one side surface 3c and the internal electrode 7 are separated from each other in the second direction D2.

The conductor 15 includes a pair of ends $15e_1$ and $15e_2$ opposing each other in the second direction D2. The end $15e_1$ are exposed to a corresponding end surface 3e of the pair of end surfaces 3e. The end $15e_1$ is exposed to the end surface 3e to which the internal electrode 7 is exposed. One end of the internal electrode 7 is exposed to the end surface 3e to which the end $15e_i$ is exposed. The end surface 3e to which the end $15e_i$ is exposed is different from the end surface 3e to which the end $11e_i$ is exposed. The end $15e_2$ is located within the element body 3.

Each conductor 15 is directly connected to the electrode portion 5e of a corresponding external electrode 5 of the pair of external electrodes 5. The end $15e_1$ is directly connected to the electrode portion 5e of the corresponding external electrode 5. Each conductor 15 is electrically connected to the electrode portion 5e of the corresponding external electrode 5. The conductor 15 is electrically connected to the electrode portion 5e to which the internal electrode 7 is electrically connected.

The conductor 15 is located between the internal electrode 7 located in the same layer as the conductor 15 and a corresponding side surface 3c of the pair of side surface 3c. The conductor 15 is located between the internal electrode 7 located in the same layer as the conductor 15 and the electrode portion 5c located on the corresponding side surface 3c. The conductor 15 is located between the second electrode layer E2, to which the internal electrode 7 located in the same layer as the conductor 15 is electrically connected, and the internal electrode 7 located in the same layer as the conductor 15. The internal electrode 7 is located between a pair of conductors 15 that are located in the same layer as the internal electrode 7, in the third direction D3. The conductor 15 opposes the auxiliary internal electrode 13 in the first direction D1.

A length $L5_1$ of the conductor 15 from the reference plane PL2 in the second direction D2 is smaller than the length $L3_2$ in the second direction D2 from the reference plane PL2 to the edge E2e of the second electrode layer E2 not electrically connected to the conductor 15.

Therefore, when the conductor 15 and the second electrode layer E2 to which the conductor 15 is not electrically connected are viewed from the third direction D3, the end $15e_2$ is exposed from the second electrode layer E2 to which the conductor 15 is not electrically connected. In this modification, the reference plane PL2 includes the end surface 3e to which the end $15e_1$ is exposed. The conductor 15 constitutes, for example, a dummy conductor that tends not to contribute to generation of capacitance.

As illustrated in FIG. 6, each of the plurality of conductors 17 is disposed in the same layer as a corresponding internal electrode 9 of the plurality of internal electrodes 9. Each of the plurality of conductors 17 is disposed between the corresponding internal electrodes 9 and the side surface 3c. In this modification, one internal electrode 9, two auxiliary internal electrodes 13, and two conductors 17 are located in the same layer. One internal electrode 9, two auxiliary internal electrodes 13, and two conductors 17 are disposed at the same position in the first direction D1. The internal electrode 9 and the conductor 17 disposed in the same layer are separated from each other in the third direction D3. The conductor 17 is separated from the side surface 3c, and is not exposed to the side surface 3c. The auxiliary internal electrode 13 and the conductor 17 disposed in the same layer and located between one side surface 3c and the internal electrode 9 are separated from each other in the second direction D2.

The conductor 17 includes a pair of ends $17e_1$ and $17e_2$ opposing each other in the second direction D2. The end $17e_1$ are exposed to a corresponding end surface 3e of the pair of end surfaces 3e. The end $17e_1$ is exposed to the end surface 3e to which the internal electrode 9 is exposed. One end of the internal electrode 9 is exposed to the end surface 3e to which the end $17e_1$ is exposed. The end surface 3e to which the end $17e_1$ is exposed is different from the end surface 3e to which the end $13e_1$ is exposed. The end $17e_2$ is located within the element body 3.

Each conductor 17 is directly connected to the electrode portion 5e of a corresponding external electrode 5 of the pair of external electrodes 5. The end $17e_1$ is directly connected to the electrode portion 5e of the corresponding external electrode 5. Each conductor 17 is electrically connected to the electrode portion 5e of the corresponding external electrode 5. The conductor 17 is electrically connected to the electrode portion 5e to which the internal electrode 9 is electrically connected.

The conductor 17 is located between the internal electrode 9 located in the same layer as the conductor 17 and a corresponding side surface 3c of the pair of side surface 3c. The conductor 17 is located between the internal electrode 7 located in the same layer as the conductor 17 and the electrode portion 5c located on the corresponding side surface 3c. The conductor 17 is located between the second electrode layer E2, to which the internal electrode 9 located in the same layer as the conductor 17 is electrically connected, and the internal electrode 9 located in the same layer as the conductor 17. The internal electrode 9 is located between a pair of conductors 17 that are located in the same layer as the internal electrode 9, in the third direction D3. The conductor 17 opposes the auxiliary internal electrode 11 in the first direction D1.

A length $L5_2$ of the conductor 17 from the reference plane PL1 in the second direction D2 is smaller than the length $L3_1$ in the second direction D2 from the reference plane PL1 to the edge E2e of the second electrode layer E2 not electrically connected to the conductor 17. Therefore, when the conductor 17 and the second electrode layer E2 to which the conductor 17 is not electrically connected are viewed from the third direction D3, the end $17e_2$ is exposed from the second electrode layer E2 to which the conductor 17 is not electrically connected. In this modification, the reference plane PL1 includes the end surface 3e to which the end $17e_1$ is exposed. The conductor 17 constitutes, for example, a dummy conductor that tends not to contribute to generation of capacitance.

The length $L5_1$ and the length $L5_2$ may be equal or different. The length $L1_1$ and the length $L5_1$ may be equal or different. The length $L1_2$ and the length $L5_2$ may be equal or different.

In this modification, the multilayer capacitor C1 includes the plurality of conductors 15 and the plurality of conductors 17. Each of the plurality of conductors 15 is located in the same layer as a corresponding auxiliary internal electrode 11 of the plurality of auxiliary internal electrodes 11, and is exposed to the end surface 3e to which the corresponding auxiliary internal electrode 11 is not exposed. Each of the plurality of conductors 17 is located in the same layer as a corresponding auxiliary internal electrode 13 of the plurality of auxiliary internal electrodes 13, and is exposed to the end surface 3e to which the corresponding auxiliary internal electrode 13 is not exposed.

In the multilayer capacitor C1, a configuration on one end surface 3e side from a center in the second direction D2 and a configuration on the other end surface 3e side from the center in the second direction D2 tend not to be different from each other. Therefore, structural defects tend not to occur in the element body 3.

In this modification, the length L51 is smaller than the length L32. Therefore, an electric field tends not to be generated between the conductor 15 and the second electrode layer E2 to which the conductor 15 is not electrically connected.

The length L52 is smaller than the length L31. Therefore, an electric field tends not to be generated between the conductor 17 and the second electrode layer E2 to which the conductor 17 is not electrically connected.

This modification reliably controls the occurrence of the migration.

Second Embodiment

Figure 7:
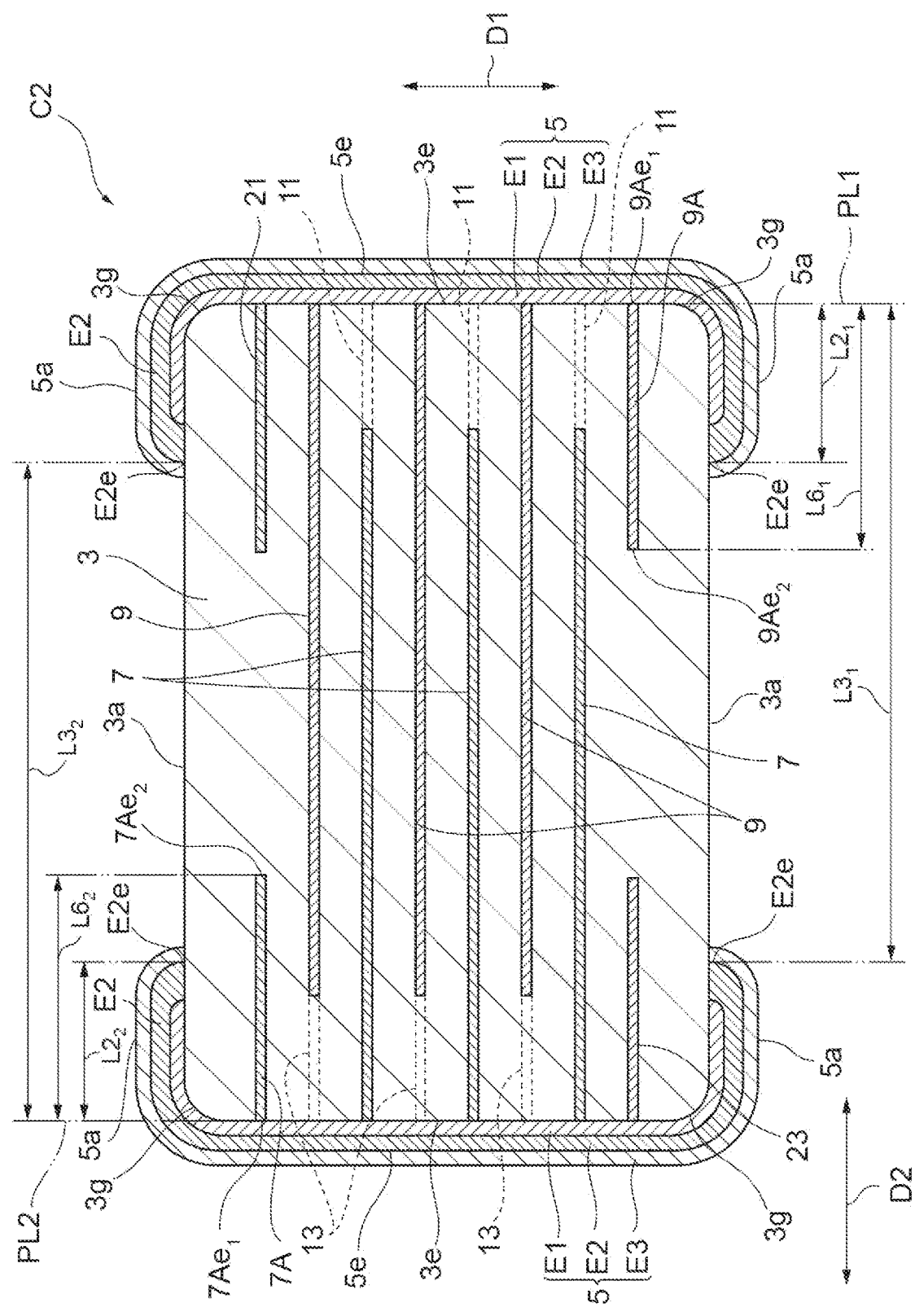
FIG. 7 is a view illustrating a cross-sectional configuration of a multilayer capacitor according to a second embodiment.
Figure 8:
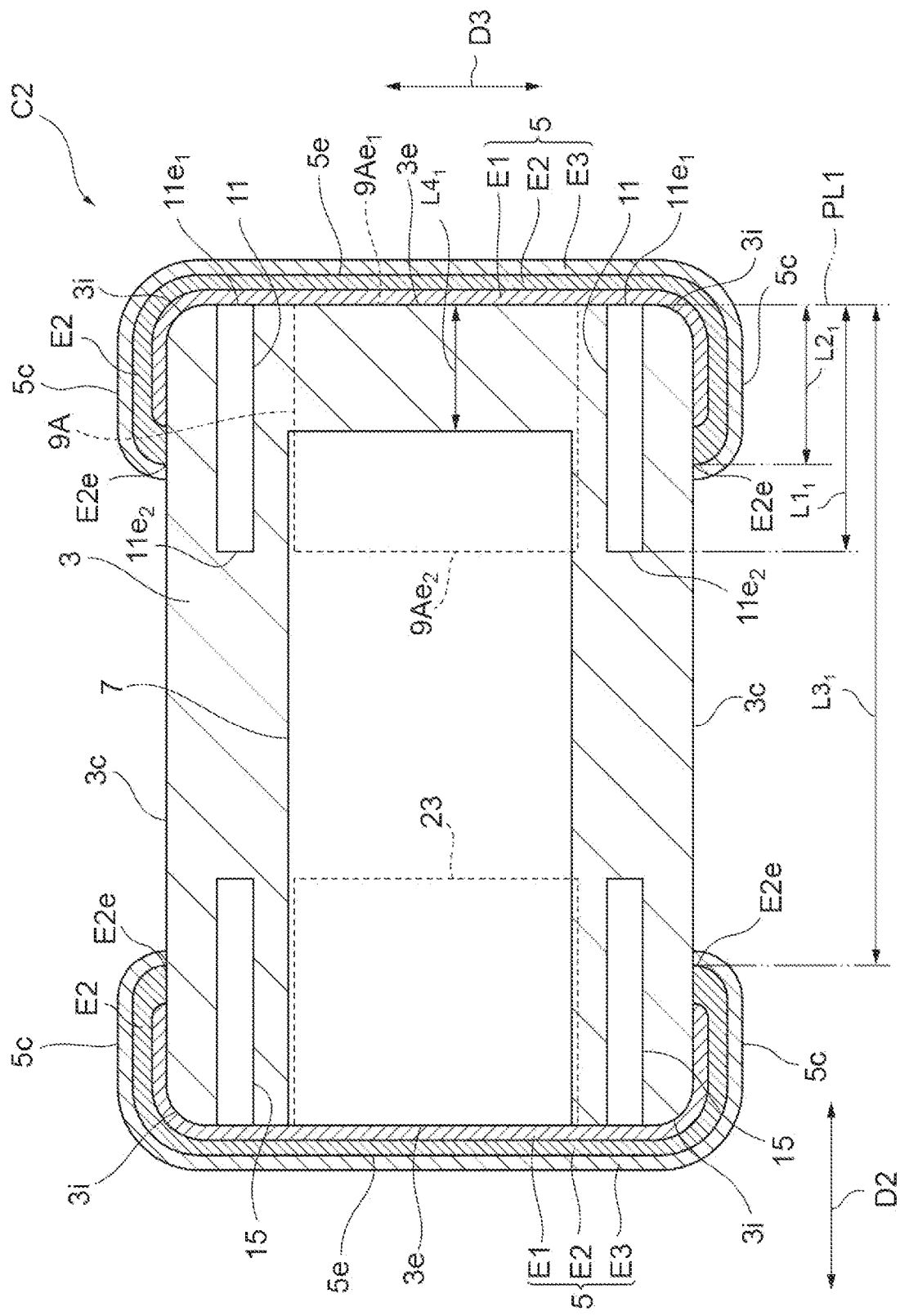
FIG. 8 is a view illustrating a cross-sectional configuration of the multilayer capacitor according to the second embodiment.
Figure 9:
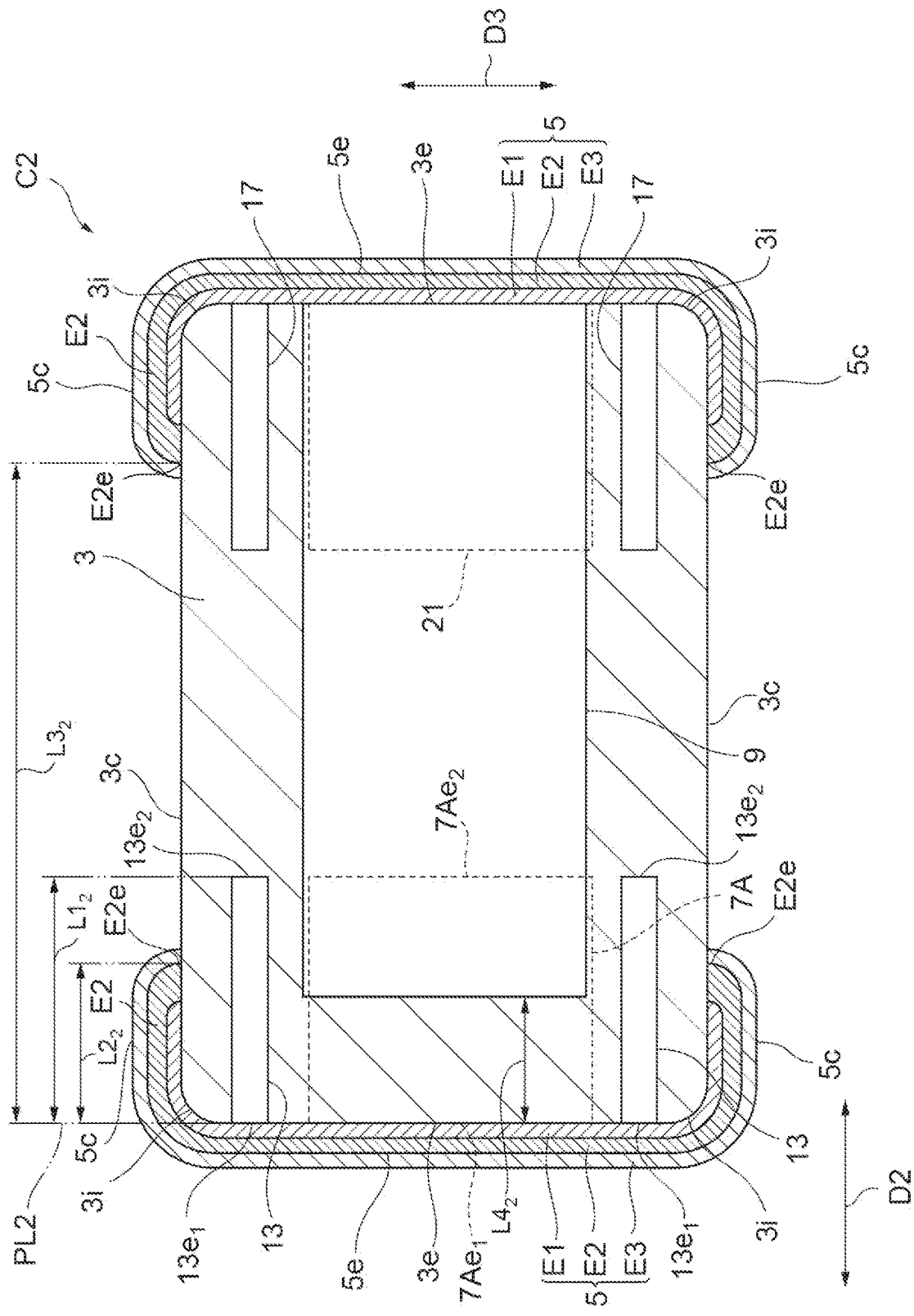
FIG. 9 is a view illustrating a cross-sectional configuration of the multilayer capacitor according to the second embodiment.

A configuration of a multilayer capacitor C2 according to a second embodiment will be described with reference to FIGS. 7 to 9. FIGS. 7, 8, and 9 are views illustrating a cross-sectional configuration of the multilayer capacitor according to the second embodiment. The multilayer capacitor C2 is generally similar to or the same as the multilayer capacitor C1. However, the multilayer capacitor C2 is different from the multilayer capacitor C1 in the configuration of the electrode portions 5a and 5e as well as the internal electrodes 7 and 9. Hereinafter, differences between the multilayer capacitor C1 and the multilayer capacitor C2 will be mainly described. In the present embodiment, an electronic component includes, for example, the multilayer capacitor C2.

As illustrated in FIGS. 7 to 9, the multilayer capacitor C2 includes an element body 3 of a rectangular parallelepiped shape, a plurality of external electrodes 5, a plurality of internal electrodes 7, and a plurality of internal electrodes 9. In the present embodiment, the multilayer capacitor C2 includes a pair of external electrodes 5. The element body 3 includes a pair of main surfaces 3a opposing each other, a pair of side surfaces 3c opposing each other, and a pair of end surfaces 3e opposing each other. Each of the external electrode 5 includes a plurality of electrode portions 5a, 5c, and 5e. Each of the electrode portions 5a, 5c and 5e includes a first electrode layer E1, a second electrode layer E2, and a third electrode layer E3.

The electrode portion 5a has a three-layered.

The second electrode layer E2 of the electrode portion 5a is disposed on the first electrode layer E1 and on the main surface 3a. In the electrode portion 5a, the second electrode layer E2 is formed to cover the first electrode layer E1 and a part of the main surface 3a. In the electrode portion 5a, the second electrode layer E2 is in direct contact with the first electrode layer E1 and the main surface 3a. The second electrode layer E2 of the electrode portion 5a is formed to cover the first electrode layer E1 of the electrode portion 5a. In the electrode portion 5a, the second electrode layer E2 indirectly covers the main surface 3a in such a manner that the first electrode layer E1 is located between the second electrode layer E2 and the main surface 3a. The second electrode layer E2 of the electrode portion 5a is located on the main surface 3a.

The third electrode layer E3 of the electrode portion 5a is disposed on the second electrode layer E2. In the electrode portion 5a, the third electrode layer E3 covers the second electrode layer E2. In the electrode portion 5a, the third electrode layer E3 is in contact with the second electrode layer E2. In the electrode portion 5a, the third electrode layer E3 is in direct contact with the second electrode layer E2. In the electrode portion 5a, the third electrode layer E3 is not in direct contact with the first electrode layer E1. The third electrode layer E3 of the electrode portion 5a is located on the main surface 3a.

The electrode portion 5e has a three-layered.

The second electrode layer E2 of the electrode portion 5e is disposed on the first electrode layer E1. In the electrode portion 5e, the second electrode layer E2 is formed to cover the entire first electrode layer E1. In the electrode portion 5e, the second electrode layer E2 is in direct contact with the first electrode layer E1. In the electrode portion 5e, the second electrode layer E2 indirectly covers the end surface 3e in such a manner that the first electrode layer E1 is located between the second electrode layer E2 and the end surface 3e. The second electrode layer E2 of the electrode portion 5e is located on the end surface 3e.

The third electrode layer E3 of the electrode portion 5e is disposed on the second electrode layer E2. In the electrode portion 5e, the third electrode layer E3 covers the entire second electrode layer E2. In the electrode portion 5e, the third electrode layer E3 is in contact with the entire second electrode layer E2. In the electrode portion 5e, the third electrode layer E3 is in direct contact with the second electrode layer E2. In the electrode portion 5e, the third electrode layer E3 is not in direct contact with the first electrode layer E1.

The second electrode layer E2 included in each of the electrode portions 5a, 5c, and 5e is integrally formed.

In the present embodiment, the plurality of internal electrodes 7 include one internal electrode 7A located on the outermost side in the first direction D1. The internal electrode 7A is the outermost internal electrode. The internal electrode 7A includes a pair of ends $7Ae_1$ and $7Ae_2$ opposing each other in the second direction D2. The end $7Ae_1$ is exposed to the end surface 3e. The end $7Ae_2$ is located within the element body 3.

In the present embodiment, the plurality of internal electrodes 9 include one internal electrode 9A located on the outermost side in the first direction D1. The internal electrode 9A is the outermost internal electrode. The internal electrode 9A includes a pair of ends $9Ae_1$ and $9Ae_2$ opposing each other in the second direction D2. The end $9Ae_1$ is exposed to the end surface 3e. The end $9Ae_2$ is located within the element body 3.

For example, when the ends $7Ae_1$ and $9Ae_1$ form a first end, the ends $7Ae_2$ and $9Ae_2$ form a second end.

As illustrated in FIG. 7, a length L62 of the internal electrode 7A from the reference plane PL2 in the second direction D2 is larger than the length L22 in the second direction D2 from the reference plane PL2 to the edge E2e of the second electrode layer E2 electrically connected to the internal electrode 7A. Therefore, when the internal electrode 7A and the second electrode layer E2 to which the internal electrode 7A is electrically connected are viewed from the first direction D1, the end $7Ae_2$ is exposed from the second electrode layer E2 to which the internal electrode 7A is electrically connected.

The length $L6_2$ is smaller than the length L32 in the second direction D2 from the reference plane PL2 to the edge E2e of the second electrode layer E2 to which the internal electrode 7A is not electrically connected. Therefore, when the internal electrode 7A and the second electrode layer E2 to which the internal electrode 7A is not electrically connected are viewed from the first direction D1, the internal electrode 7A and the second electrode layer E2 to which the internal electrode 7A is not electrically connected do not overlap each other.

The reference plane PL2 includes the end surface 3e to which the end 7Ae₁ of the internal electrode 7A is exposed.

A length $L6_1$ of the internal electrode 9A from the reference plane PL1 in the second direction D2 is larger than the length $L2_1$ in the second direction D2 from the reference plane PL1 to the edge E2e of the second electrode layer E2 electrically connected to the internal electrode 9A. Therefore, when the internal electrode 9A and the second electrode layer E2 to which the internal electrode 9A is electrically connected are viewed from the first direction D1, the end 9Ae₂ is exposed from the second electrode layer E2 to which the internal electrode 9A is electrically connected.

The length $L6_1$ is smaller than the length $L3_1$ in the second direction D2 from the reference plane PL1 to the edge E2e of the second electrode layer E2 to which the internal electrode 9A is not electrically connected. Therefore, when the internal electrode 9A and the second electrode layer E2 to which the internal electrode 9A is not electrically connected are viewed from the first direction D1, the internal electrode 9A and the second electrode layer E2 to which the internal electrode 9A is not electrically connected do not overlap each other.

The reference plane PL1 includes the end surface 3e to which the end 9Ae₁ of the internal electrode 9A is exposed. The length $L6_1$ and the length $L6_2$ may be equal or different. The lengths $L6_2$ and $L6_2$ and the lengths $L1_1$ and $L1_2$ may be equal or different.

The multilayer capacitor C1 includes a plurality of internal conductors 21 and 23 as illustrated in FIGS. 7 to 9. The plurality of internal conductors 21 and 23 are disposed in the element body 3. In the present embodiment, the multilayer capacitor C2 includes two internal conductors 21 and 23. In FIGS. 8 and 9, for the sake of explanation, the internal electrodes 7 and 9 (internal electrodes 7A and 9A) and the internal conductors 21 and 23 are intentionally illustrated so as to deviate from each other in the third direction D3.

Similar to the internal electrodes 7 and 9, the internal conductors 21 and 23 are made of an electrically conductive material that is commonly used as an internal conductor of a multilayer electronic component. The electrically conductive material includes, for example, a base metal. The electrically conductive material includes, for example, Ni or Cu. Each of the internal conductors 21 and 23 is configured as a sintered body of an electrically paste containing electrically conductive material described above. In the present embodiment, the internal conductors 21 and 23 are made of Ni.

The internal conductor 21 is located in the same layer as the internal electrode 7A and is separated from the internal electrode 7A. The internal conductor 21 includes one end exposed to a corresponding end surface 3e of the pair of end surfaces 3e. The one end of the internal conductor 21 is exposed to the end surface 3e to which one end of the internal electrode 9 is exposed. The one end of the internal conductor 21 is entirely covered by a corresponding electrode portion 5e of the plurality of electrode portions 5e. The internal conductor 21 is directly connected to the corresponding electrode portion 5e. The internal conductor 21 is electrically connected to a corresponding external electrode 5 of the pair of external electrodes 5. In the present embodiment, the internal conductor 21 is electrically connected to the external electrode 5 (electrode portion 5e) to which the internal electrode 9 is electrically connected. The internal conductor 21 is electrically connected to the external electrode 5 to which the internal electrode 7 is not electrically connected.

The internal conductor 23 is located in the same layer as the internal electrode 9A and is separated from the internal electrode 9A. The internal conductor 23 includes one end exposed to a corresponding end surface 3e of the pair of end surfaces 3e. The one end of the internal conductor 23 is exposed to the end surface 3e to which one end of the internal electrode 7 is exposed. The one end of the internal conductor 23 is entirely covered by a corresponding electrode portion 5e of the plurality of electrode portions 5e. The internal conductor 23 is directly connected to the corresponding electrode portion 5e. The internal conductor 23 is electrically connected to a corresponding external electrode 5 of the pair of external electrodes 5. In the present embodiment, the internal conductor 23 is electrically connected to the external electrode 5 (electrode portion 5e) to which the internal electrode 7 is electrically connected. The internal conductor 23 is electrically connected to the external electrode 5 to which the internal electrode 9 is not electrically connected.

The internal conductors 21 and 23 constitute, for example, dummy conductors that tend not to contribute to generation of capacitance.

When the multilayer capacitor C2 is solder-mounted on an electronic device, an external force acting on the multilayer capacitor C2 from the electronic device may act on the element body 3 through the electrode portion 5a. The external force is transmitted to the electrode portion 5a from the electronic device. The electronic device includes, for example, a circuit board or an electronic component.

In the multilayer capacitor C2, the electrode portion 5a includes the second electrode layer E2. Therefore, the external force tends not to act on the element body 3 from the electrode portion 5a. Consequently, the multilayer capacitor C2 further controls occurrence of cracks in the element body 3.

In the multilayer capacitor C2, the length $L6_1$ is larger than the length $L2_1$. Therefore, the internal electrode 7 adjacent to the internal electrode 9A in the first direction D1 and the second electrode layer E2 included in the electrode portion 5a adjacent to the internal electrode 9A in the first direction D1 are not electrically connected to each other, but tend not to oppose each other in the first direction D1. An electric field tends not to be generated between the second electrode layer E2 and the internal electrode 7 that are not electrically connected to each other.

The length $L6_2$ is larger than the length $L2_2$. Therefore, the internal electrode 9 adjacent to the internal electrode 7A in the first direction D1 and the second electrode layer E2 included in the electrode portion 5a adjacent to the internal electrode 7A in the first direction D1 are not electrically connected to each other, but tend not to oppose each other in the first direction D1. An electric field tends not to be generated between the second electrode layer E2 and the internal electrode 9 that are not electrically connected to each other.

The length $L6_1$ is smaller than the length $L3_1$. Therefore, the internal electrode 9A tends not to oppose the second electrode layer E2 included in the electrode portion 5a, to which the internal electrode 9A is not electrically connected, in the first direction D1. An electric field tends not to be generated between the second electrode layer E2 and the internal electrode 9A that are not electrically connected to each other.

The length $L6_2$ is smaller than the length $L3_2$. Therefore, the internal electrode 7A tends not to oppose the second electrode layer E2 included in the electrode portion 5a, to which the internal electrode 7A is not electrically connected, in the first direction D1. An electric field tends not to be generated between the second electrode layer E2 and the internal electrode 7A that are not electrically connected to each other.

Consequently, the multilayer capacitor C2 controls occurrence of migration.

The multilayer capacitor C2 includes the internal conductors 21 and 23. The internal conductor 21 is electrically connected to the external electrode 5 to which the internal electrode 7A is not electrically connected. The internal conductor 23 is electrically connected to the external electrode 5 to which the internal electrode 9A is not electrically connected.

In the multilayer capacitor C2, the internal conductor 21 is located in the same layer as the internal electrode 7A, and the internal conductor 23 is located in the same layer as the internal electrode 9A. Therefore, in the multilayer capacitor C2, a configuration on one end surface 3e side from a center in the second direction D2 and a configuration on the other end surface 3e side from the center in the second direction D2 tend not to be different from each other. Consequently, structural defects tend not to occur in the element body 3.

Third Embodiment

Figure 10:
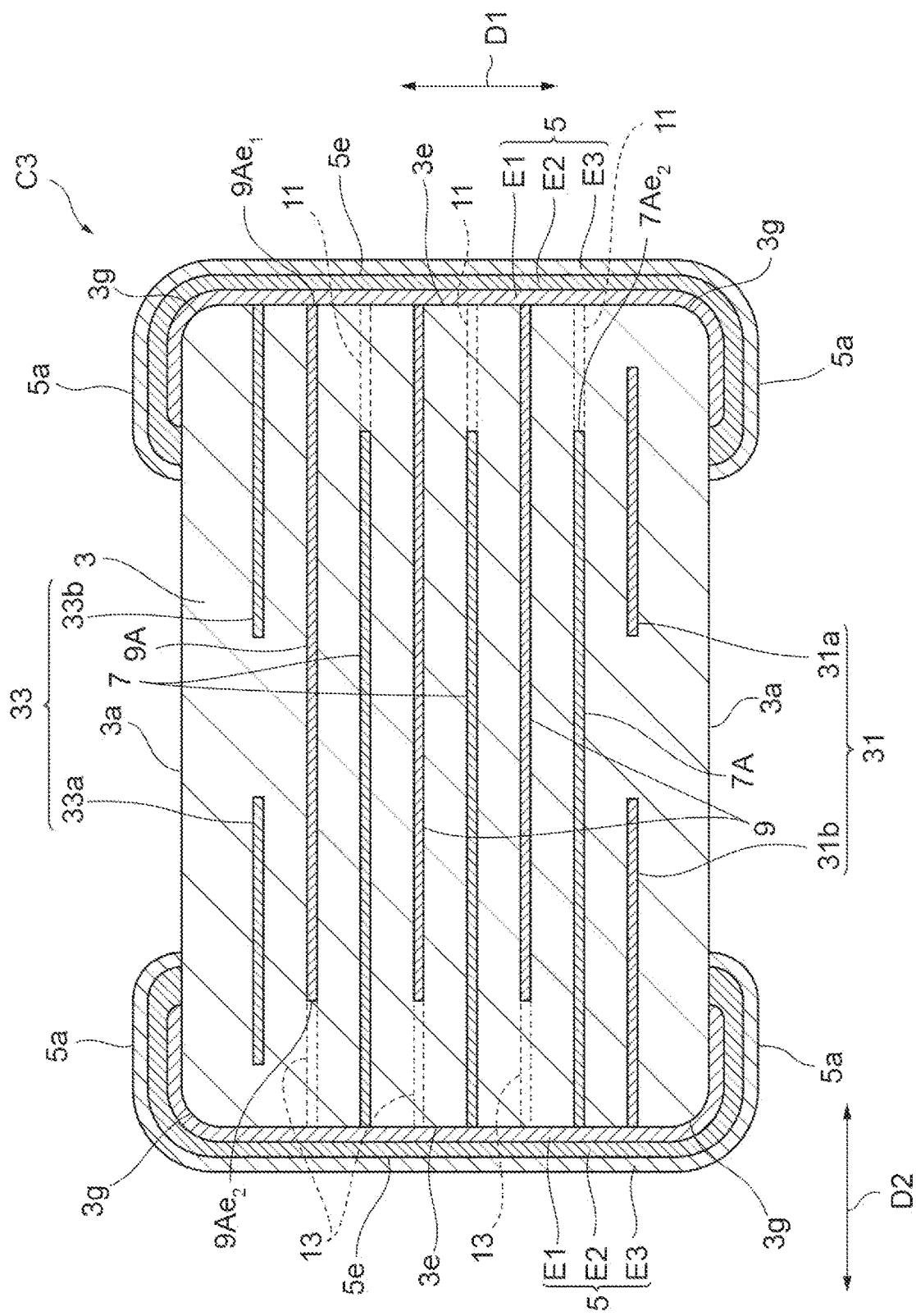
FIG. 10 is a view illustrating a cross-sectional configuration of a multilayer capacitor according to a third embodiment.
Figure 11:
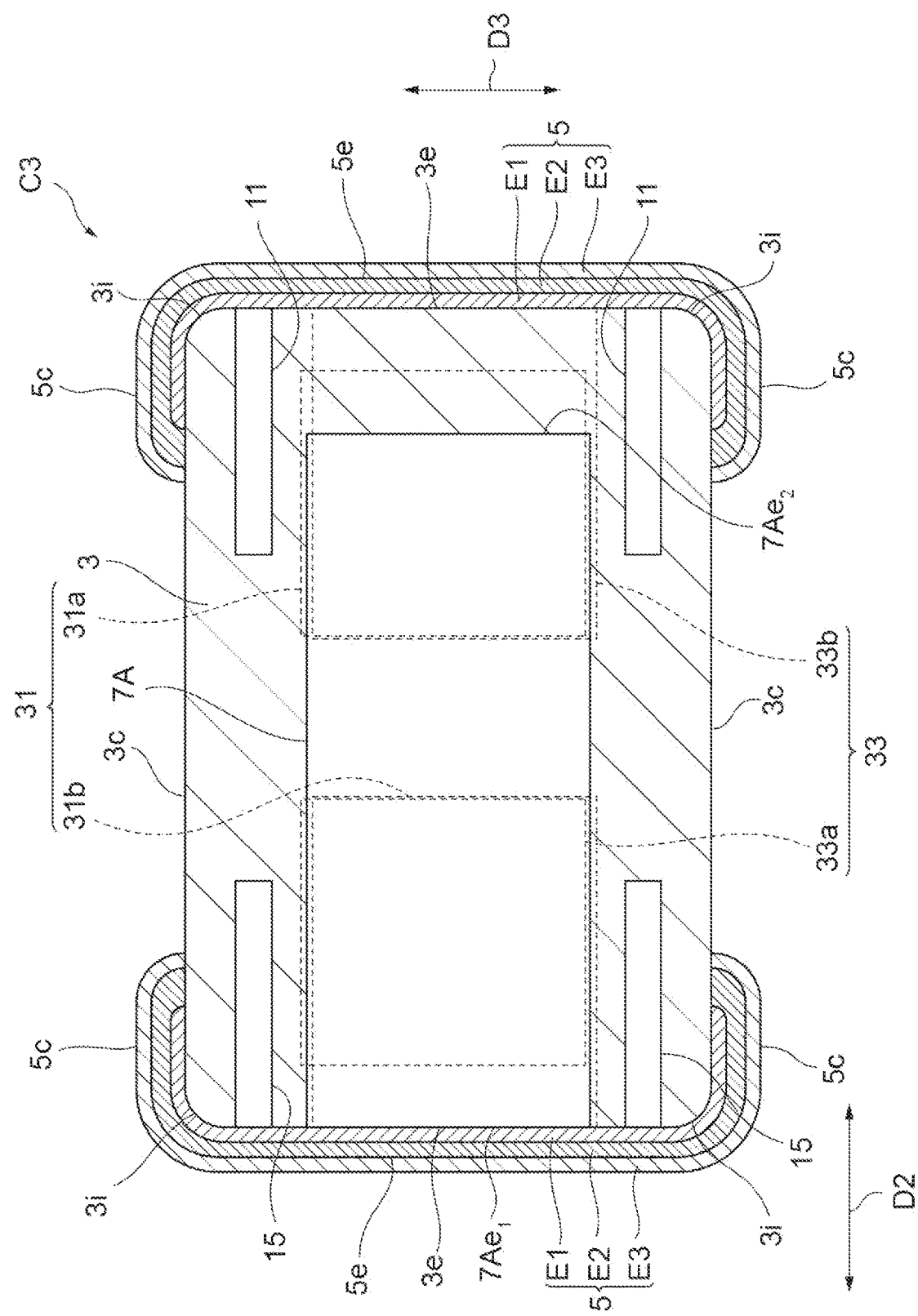
FIG. 11 is a view illustrating a cross-sectional configuration of the multilayer capacitor according to the third embodiment.
Figure 12:
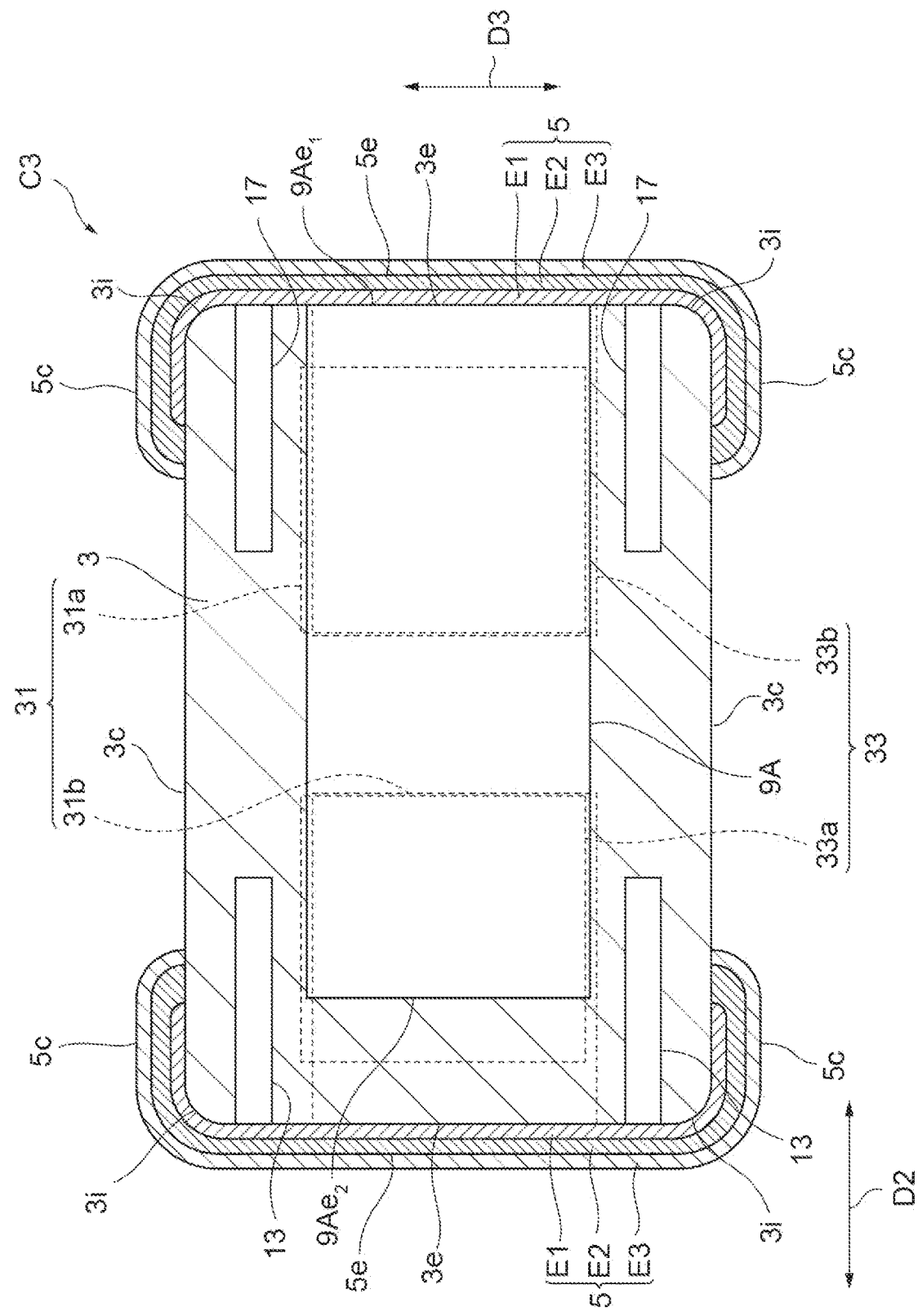
FIG. 12 is a view illustrating a cross-sectional configuration of the multilayer capacitor according to the third embodiment.

A configuration of a multilayer capacitor C3 according to a third embodiment will be described with reference to FIGS. 10 to 12. FIGS. 10, 11, and 12 are views illustrating a cross-sectional configuration of the multilayer capacitor according to the third embodiment. The multilayer capacitor C3 is generally similar to or the same as the multilayer capacitor C2. However, the multilayer capacitor C3 is different from the multilayer capacitor C2 in a configuration of a conductor disposed in the element body 3. Hereinafter, differences between the multilayer capacitor C2 and the multilayer capacitor C3 will be mainly described.

In the present embodiment, an electronic component includes, for example, the multilayer capacitor C3.

As illustrated in FIGS. 10 to 12, the multilayer capacitor C3 includes an element body 3 of a rectangular parallelepiped shape, a plurality of external electrodes 5, a plurality of internal electrodes 7, and a plurality of internal electrodes 9. In the present embodiment, the multilayer capacitor C3 includes a pair of external electrodes 5. The element body 3 includes a pair of main surfaces 3a opposing each other, a pair of side surfaces 3c opposing each other, and a pair of end surfaces 3e opposing each other. Each of the external electrode 5 includes a plurality of electrode portions 5a, 5c, and 5e. Each of the electrode portions 5a, 5c and 5e includes a first electrode layer E1, a second electrode layer E2, and a third electrode layer E3.

As illustrated in FIGS. 10 to 12, the multilayer capacitor C3 includes a pair of internal conductor layers 31 and 33. The pair of internal conductor layers 31 and 33 are disposed in the element body 3. In FIGS. 11 and 12, for the sake of explanation, the internal electrodes 7A and 9A and the internal conductor layers 31 and 33 are intentionally illustrated so as to deviate from each other in the third direction D3.

The internal conductor layer 31 is adjacent to one main surface 3a in the first direction D1. The internal conductor layer 31 is adjacent to the internal electrode 7A in the first direction D1. The internal conductor layer 31 is located between the one main surface 3a and the internal electrode 7A. The internal conductor layer 31 includes an internal conductor 31a and an internal conductor 31b.

The internal conductor 31a opposes the second electrode layer E2 that is not electrically connected to the internal electrode 7A and that is disposed on the one main surface 3a, in the first direction D1. Therefore, the internal conductor 31a opposes the second electrode layer E2 that is included in the electrode portion 5a to which the internal electrode 7A is not electrically connected, in the first direction D1.

The internal conductor 31b opposes the second electrode layer E2 that is electrically connected to the internal electrode 7A and that is disposed on the one main surface 3a, in the first direction D1.

For example, when the internal conductor 31a constitutes one internal conductor, the internal conductor 31b constitutes another internal conductor.

The internal conductor 31a is separated from the internal conductor 31b in the second direction D2, and is not electrically connected to any second electrode layer E2. The internal conductor 31a includes no end exposed to the surface of the element body 3.

The internal conductor 31b is electrically connected to the second electrode layer E2 included in the electrode portion 5a opposing the internal conductor 31b in the first direction D1. The internal conductor 31b includes an end exposed to the end surface 3e to which the internal electrode 7A is exposed. The internal conductor 31b is directly connected to the external electrode 5 (electrode portion 5e), to which the internal electrode 7A is electrically connected, at the end exposed to the end surface 3e. The internal conductor 31b is electrically connected to the external electrode 5 to which the internal electrode 7A is electrically connected. The internal conductor 31b may not be electrically connected to any second electrode layer E2.

The internal conductors 31a and 31b constitute, for example, dummy conductors that tends not to contribute to generation of capacitance.

The internal conductor layer 33 is adjacent to the other main surface 3a in the first direction D1. The internal conductor layer 33 is adjacent to the internal electrode 9A in the first direction D1. The internal conductor layer 33 is located between the other main surface 3a and the internal electrode 9A. The internal conductor layer 33 includes an internal conductor 33a and an internal conductor 33b.

The internal conductor 33a opposes the second electrode layer E2 that is not electrically connected to the internal electrode 9A and that is disposed on the other main surface 3a, in the first direction D1. Therefore, the internal conductor 33a opposes the second electrode layer E2 that is included in the electrode portion 5a to which the internal electrode 9A is not electrically connected, in the first direction D1.

The internal conductor 33b opposes the second electrode layer E2 that is electrically connected to the internal electrode 9A and that is disposed on the other main surface 3 a, in the first direction D1.

For example, when the internal conductor 33a constitutes one internal conductor, the internal conductor 33b constitutes another internal conductor.

The internal conductor 33a is separated from the internal conductor 33b in the second direction D2, and is not electrically connected to any second electrode layer E2. The internal conductor 33a includes no end exposed to the surface of the element body 3.

The internal conductor 33b is electrically connected to the second electrode layer E2 included in the electrode portion 5a opposing the internal conductor 33b in the first direction D1. The internal conductor 33b includes an end exposed to the end surface 3e to which the internal electrode 9A is exposed. The internal conductor 33b is directly connected to the external electrode 5 (electrode portion 5e), to which the internal electrode 9A is electrically connected, at the end exposed to the end surface 3e. The internal conductor 33b is electrically connected to the external electrode 5 to which the internal electrode 9A is electrically connected. The internal conductor 33b may not be electrically connected to any second electrode layer E2.

The internal conductors 33a and 33b constitute, for example, dummy conductors that tends not to contribute to generation of capacitance.

The end 7Ae$_2$ overlaps the internal conductor 31a when viewed from the first direction D1. In the positional relationship among the internal electrode 7A, the second electrode layer E2 to which the internal electrode 7A is not electrically connected and that is disposed on the one main surface 3a, and the internal conductor 31a, the internal conductor 31a is located between the internal electrode 7A and the second electrode layer E2. Therefore, in the positional relationship described above, the internal electrode 7A and the second electrode layer E2 that is not electrically connected to the internal electrode 7A and that is disposed on the one main surface 3a do not oppose each other in the first direction D1.

The end 9Ae$_2$ overlaps the internal conductor 33a when viewed from the first direction D1. In the positional relationship among the internal electrode 9A, the second electrode layer E2 to which the internal electrode 9A is not electrically connected and that is disposed on the other main surface 3a, and the internal conductor 33a, the internal conductor 33a is located between the internal electrode 9A and the second electrode layer E2. Therefore, in the positional relationship described above, the internal electrode 9A and the second electrode layer E2 that is not electrically connected to the internal electrode 9A and that is disposed on the other main surface 3a do not oppose each other in the first direction D1.

Similar to the internal electrodes 7 and 9, the internal conductors 31a, 31b, 33a, and 33b are made of an electrically conductive material that is commonly used as an internal conductor of a multilayer electronic component. The electrically conductive material includes, for example, a base metal. The electrically conductive material includes, for example, Ni or Cu. Each of the internal conductors 31a, 31b, 33a, and 33b is configured as a sintered body of an electrically conductive paste containing the electrically conductive material described above. In the present embodiment, the internal conductors 31a, 31b, 33a, and 33b are made of Ni.

In the multilayer capacitor C3, the internal conductor layer 31 is located between the second electrode layer E2 and the internal electrode 7A that is not electrically connected to the second electrode layer E2.

Due to the internal conductor layer 31, the second electrode layer E2 is separated from the internal electrode 7A that is not electrically connected to the second electrode layer E2. Therefore, an electric field tends not to be generated between the second electrode layer E2 and the internal electrode 7A that is not electrically connected to the second electrode layer E2. Even when an electric field is generated between the second electrode layer E2 and the internal electrode 7A that is not electrically connected to the second electrode layer E2, intensity of the electric field intensity is small.

The internal conductor layer 33 is located between the second electrode layer E2 and the internal electrode 9A that is not electrically connected to the second electrode layer E2. Due to the internal conductor layer 33, the second electrode layer E2 is separated from the internal electrode 9A that is not electrically connected to the second electrode layer E2. Therefore, an electric field tends not to be generated between the second electrode layer E2 and the internal electrode 9A that is not electrically connected to the second electrode layer E2. Even when an electric field is generated between the second electrode layer E2 and the internal electrode 9A that is not electrically connected to the second electrode layer E2, intensity of the electric field is small.

Consequently, the multilayer capacitor C3 controls occurrence of migration.

The internal conductor 31a opposes the second electrode layer E2, to which the internal electrode 7A adjacent to the internal conductor 31a in the first direction D1 is not electrically connected, in the first direction D1. The internal conductor 31a is located between the electrode portion 5a that is not electrically connected to the internal conductor 31a, and the internal electrode 7A that is not electrically connected to the electrode portion 5a, in the first direction D1. The internal conductor 31a is located between the electrode portion 5a and the internal electrode 7A that are not electrically connected to each other, in the first direction D1. Therefore, the electrode portion 5a and the internal electrode 7A that are not electrically connected to each other tend not to directly oppose each other in the first direction D1. An electric field tends not to be generated between the second electrode layer E2 of the electrode portion 5a and the internal electrode 7A that are not electrically connected to each other.

The internal conductor 33a opposes the second electrode layer E2, to which the internal electrode 9A adjacent to the internal conductor 33a in the first direction D1 is not electrically connected, in the first direction D1. The internal conductor 33a is located between the electrode portion 5a that is not electrically connected to the internal conductor 33a, and the internal electrode 9A that is not electrically connected to the electrode portion 5a, in the first direction D1. The internal conductor 33a is located between the electrode portion 5a and the internal electrode 9A that are not electrically connected to each other, in the first direction D1. Therefore, the electrode portion 5a and the internal electrode 9A that are not electrically connected to each other tend not to directly oppose each other in the first direction D1. An electric field tends not to be generated between the second electrode layer E2 of the electrode portion 5a and the internal electrode 9A that are not electrically connected to each other.

Consequently, the multilayer capacitor C3 reliably controls the occurrence of the migration.

The end 7Ae$_2$ overlaps the internal conductor 31a when viewed from the first direction D1. Therefore, an electric field further tends not to be generated between the second electrode layer E2 and the internal electrode 7A that is not electrically connected to the second electrode layer E2.

The end 9Ae$_2$ overlaps the internal conductor 33a when viewed from the first direction D1. Therefore, an electric field further tends not to be generated between the second electrode layer E2 and the internal electrode 9A that is not electrically connected to the second electrode layer E2.

Consequently, the multilayer capacitor C3 controls the occurrence of the migration more reliably.

The internal conductor 31b is disposed in the same layer as the internal conductor 31a. The internal conductor 31b opposes the second electrode layer E2 that is included in the electrode portion 5a to which the internal electrode 7A is electrically connected, in the first direction D1. The internal conductor 33b is disposed in the same layer as the internal conductor 33a. The internal conductor 33b opposes the second electrode layer E2 that is included in the electrode portion 5a to which the internal electrode 9A is electrically connected, in the first direction D1.

In the multilayer capacitor C3, a configuration on one end surface 3e side from a center in the second direction D2 and a configuration on the other end surface 3e side from the center in the second direction D2 tend not to be different from each other. Therefore, structural defects tend not to occur in the element body 3.

Fourth Embodiment

Figure 13:
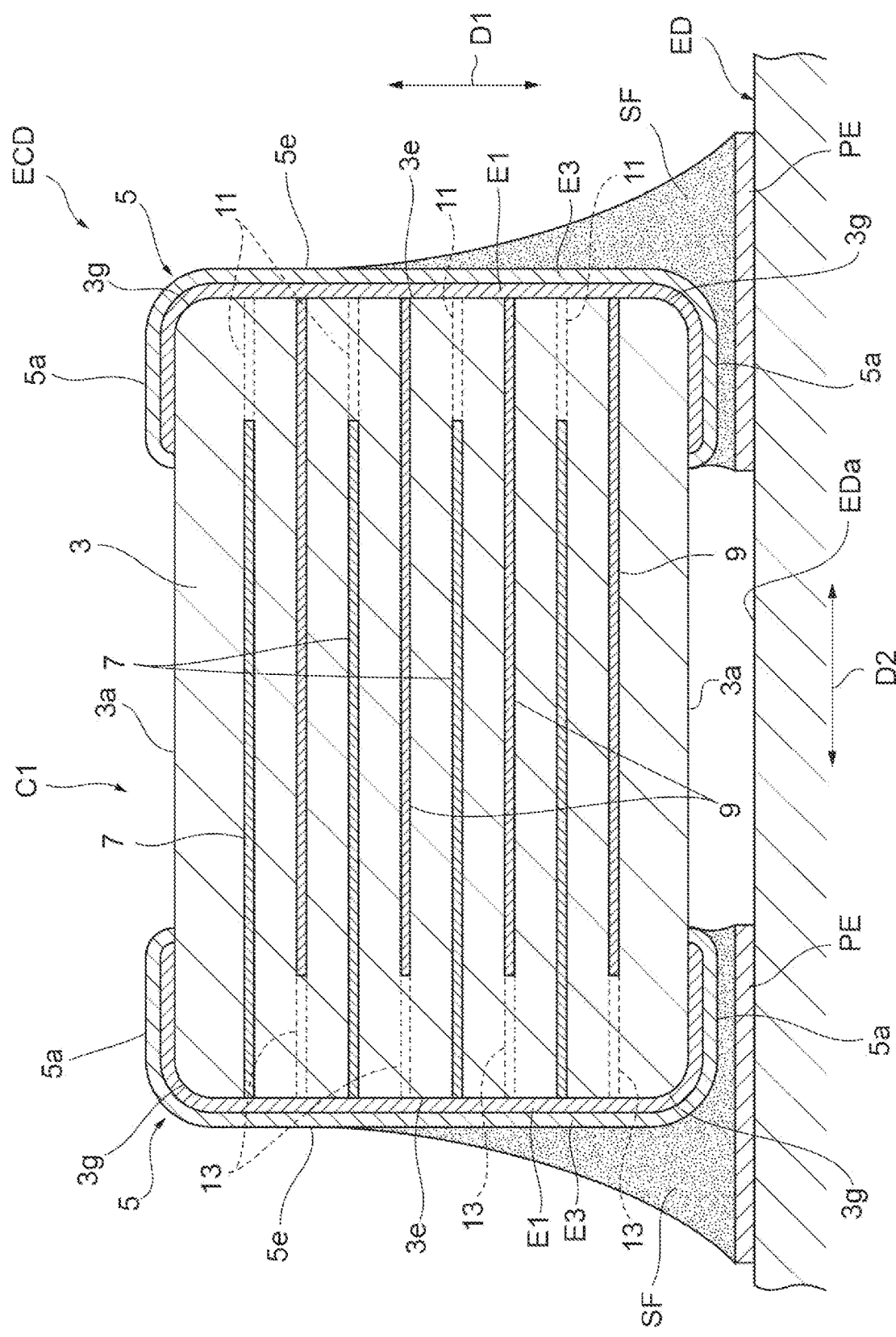
FIG. 13 is a view illustrating a cross-sectional configuration of an electronic component device according to a fourth embodiment.
Figure 14:
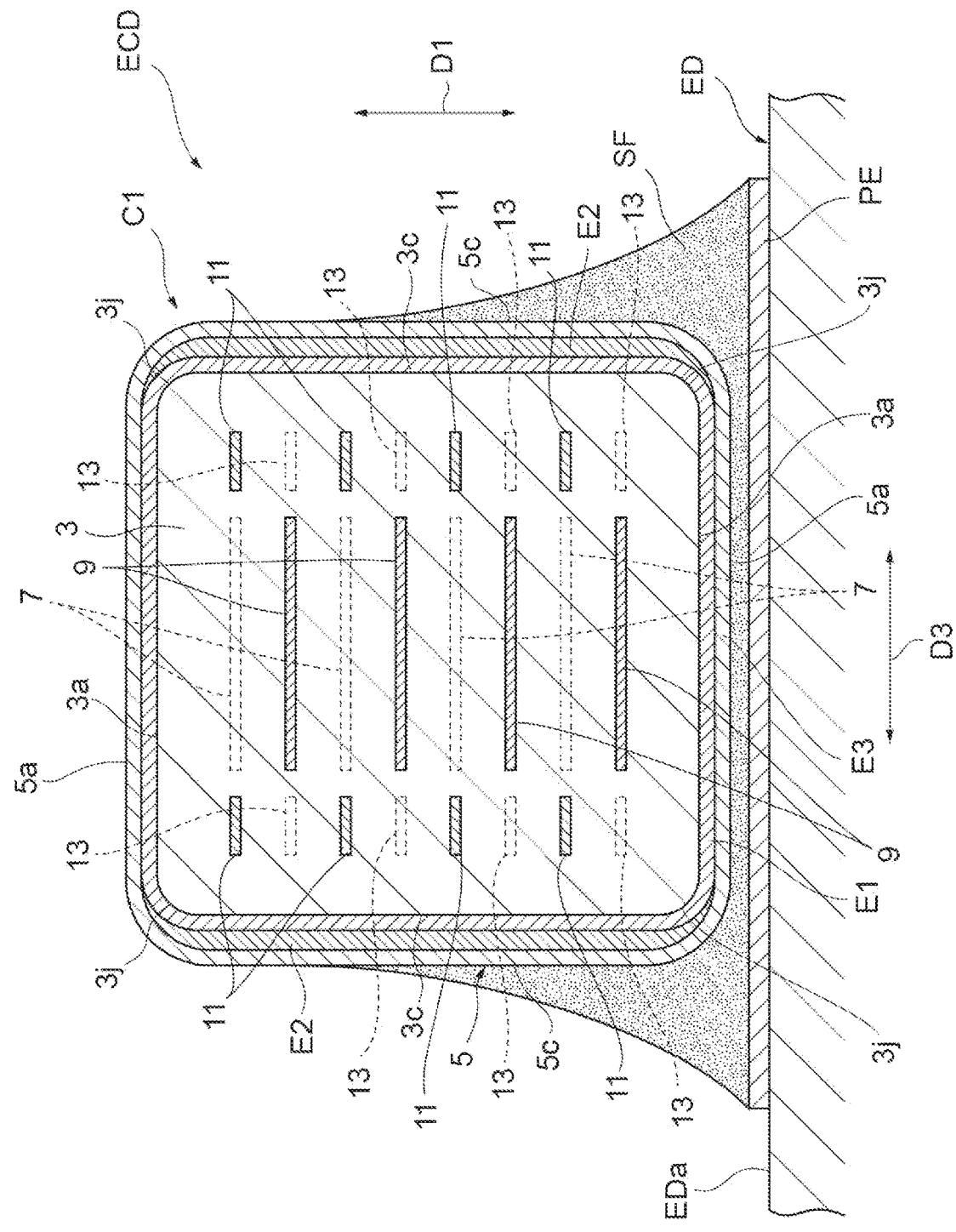
FIG. 14 is a view illustrating a cross-sectional configuration of the electronic component device according to the fourth embodiment.

A configuration of an electronic component device ECD according to a fourth embodiment will be described with reference to FIGS. 13 and 14. FIGS. 13 and 14 are views illustrating a cross-sectional configuration of the electronic component device according to the fourth embodiment.

As illustrated in FIGS. 13 and 14, the electronic component device ECD includes the multilayer capacitor C1 and an electronic device ED. The electronic device ED includes, for example, a circuit board or an electronic component. The multilayer capacitor C1 is solder-mounted on the electronic device ED. The electronic device ED includes a main surface EDa and two pad electrodes PE. Each pad electrode PE is disposed on the main surface EDa. The two pad electrodes PE are separated from each other. The multilayer capacitor C1 is disposed on the electronic device ED in such a manner that the main surface 3a arranged to constitute the mounting surface and the main surface EDa oppose each other. Each of the internal electrodes 7 and 9 is located in a plane approximately parallel to the main surface EDa.

In solder-mounting the multilayer capacitor C1, the molten solder wets the external electrode 5 (third electrode layer E3). Solidification of the wet solder causes a solder fillet SF to be formed on the external electrode 5. The external electrodes 5 and the pad electrodes PE corresponding to each other are connected to each other through the solder fillet SF.

Although the embodiment and modifications of the present invention have been described above, the present invention is not necessarily limited to the embodiment and modifications, and the embodiment can be variously changed without departing from the scope of the invention.

The electronic component device ECD may include the multilayer capacitor C2 or the multilayer capacitor C3 instead of the multilayer capacitor C1.

In the present embodiments and modifications, electronic components are the multilayer capacitors C1, C2, and C3. However, applicable electronic component is not limited to the multilayer capacitor. The applicable electronic component includes, for example, a multilayer electronic component such as a multilayer inductor, a multilayer varistor, a multilayer piezoelectric actuator, a multilayer thermistor, or a multilayer composite component, or electronic components other than the multilayer electronic components.

What is claimed is:

1. An electronic component, comprising:
   an element body of a rectangular parallelepiped shape including a pair of main surfaces opposing each other in a first direction, a pair of end surfaces opposing each other in a second direction, and a pair of side surfaces opposing each other in a third direction;
   a plurality of external electrodes disposed on both ends of the element body in the second direction;
   a plurality of internal electrodes disposed in the element body to be distributed in the first direction, each of the plurality of internal electrodes being electrically connected to a corresponding external electrode of the plurality of external electrodes; and
   a plurality of auxiliary internal electrodes disposed in the same layer as the plurality of internal electrodes to be located between each of the pair of side surfaces and the plurality of internal electrodes,
   wherein each of the plurality of external electrodes includes a pair of side surface electrode portions disposed on the pair of side surfaces and including a conductive resin layer,
   each of the plurality of auxiliary internal electrodes is electrically connected to the external electrode to which the internal electrode located in the same layer is not electrically connected, and is located between the conductive resin layer to which the internal electrode located in the same layer is not electrically connected and the internal electrode located in the same layer,
   each of the plurality of auxiliary internal electrodes is not exposed to a corresponding side surface of the pair of side surfaces, and
   the plurality of internal electrodes includes an outermost internal electrode located on an outermost side in the first direction, the outermost internal electrode having a length smaller than a length of an internal electrode, among the plurality of internal electrodes, electrically connected to the outermost internal electrode.

2. The electronic component according to claim 1,
   wherein, in the two conductive resin layers located on the same side surface, one of the conductive resin layers includes an edge opposing the other conductive resin layer, and
   with a plane including the end surface as a reference plane, a first length of the auxiliary internal electrode from the reference plane in the second direction is larger than a second length from the reference plane to the edge of the conductive resin layer to which the auxiliary internal electrode is electrically connected and smaller than a third length from the reference plane to the edge of the conductive resin layer to which the auxiliary internal electrode is not electrically connected.

3. The electronic component according to claim 2, further comprising:
   a plurality of dummy conductors disposed in the same layer as the plurality of internal electrodes to be located between each of the pair of side surfaces and the plurality of internal electrodes,
   wherein each of the plurality of dummy conductors is electrically connected to the external electrode to which the internal electrode located in the same layer is electrically connected.

4. The electronic component according to claim 3,
   wherein a length of the dummy conductor from the reference plane in the second direction is smaller than a length from the reference plane to the edge of the conductive resin layer to which the dummy conductor is not electrically connected.

5. The electronic component according to claim 1,
   wherein each of the plurality of external electrodes includes a pair of main surface electrode portions disposed on the main surface and including a conductive resin layer, the outermost internal electrode includes a first end exposed to the end surface and a second end opposing the first end in the second direction and located in the element body, when the outermost internal electrode and the conductive resin layer included in the main surface electrode portion to which the outermost internal electrode is electrically connected are viewed from the first direction, the second end is exposed from the conductive resin layer included in the main surface electrode portion, when the outermost internal electrode and the conductive resin layer included in the main surface electrode portion to which the outermost internal electrode is not electrically connected are viewed from the first direction, the outermost internal electrode and the conductive resin layer included in the main surface electrode portion do not overlap each other, and when the internal electrode electrically connected to the outermost internal electrode and the conductive resin layer included in the main surface electrode portion to which the outermost internal electrode is not electrically connected are viewed from the first direction, the internal electrode electrically connected to the outermost internal electrode and the conductive resin layer included in the main surface electrode portion overlap each other.

6. The electronic component according to claim 5, further comprising:
an internal conductor located in the same layer as the outermost internal electrode and separated from the outermost internal electrode,
wherein the internal conductor is electrically connected to the external electrode to which the outermost internal electrode located in the same layer as the internal conductor is not electrically connected.

7. The electronic component according to claim 1, further comprising:
a pair of internal conductors disposed between a corresponding main surface of the pair of main surfaces and an outermost internal electrode located on an outermost side in the first direction, among the plurality of internal electrodes, to oppose the outermost internal electrode in the first direction,
wherein each of the plurality of external electrodes includes a pair of main surface electrode portions disposed on the main surface and including a conductive resin layer, and
each of the pair of internal conductors opposes the conductive resin layer included in the main surface electrode portion, to which the outermost internal electrode opposing the internal conductor in the first direction is not electrically connected, in the first direction.

8. The electronic component according to claim 7, further comprising:
a pair of other internal conductors disposed in the same layer as a corresponding internal conductor of the pair of internal conductors,
wherein each of the pair of other internal conductors opposes the conductive resin layer included in the main surface electrode portion, to which the outermost internal electrode opposing the other internal conductors in the first direction is electrically connected, in the first direction.

9. The electronic component according to claim 1, wherein, when the internal electrode and the conductive resin layer included in the side surface electrode portion that are not electrically connected to each other are viewed from the third direction, the internal electrode and the conductive resin layer included in the side surface electrode portion overlap each other.

10. The electronic component according to claim 1, wherein the conductive resin layer includes a plurality of silver particles.

11. The electronic component according to claim 1, wherein
the element body includes a plurality of dielectric layers distributed in the first direction and each extending in the second direction and the third direction,
each of the plurality of internal electrodes is arranged in a respective dielectric layer and extends in the second direction and the third direction, and
at least one of the dielectric layers includes a region which contains no internal electrode in the third direction and in which one of the auxiliary internal electrodes is sandwiched between two portions of the dielectric layer in the third direction.

12. An electronic component, comprising:
an element body including a side surface;
an electrode portion on the side surface including a conductive resin layer;
an internal electrode in the element body being not electrically connected to the electrode portion, the internal electrode being located away from the side surface in a plane intersecting the side surface;
an auxiliary internal electrode in the same layer as the internal electrode and between the side surface and the internal electrode, the auxiliary internal electrode being electrically connected to the electrode portion to which the internal electrode is not electrically connected; and
an outermost internal electrode located on an outermost side in a direction perpendicular to the plane intersecting the side surface and electrically connected to the internal electrode, wherein
the auxiliary internal electrode is not exposed to the side surface, and
the outermost internal electrode has a length smaller than a length of the internal electrode.

13. The electronic component according to claim 12, wherein the element body includes an end surface at which the auxiliary internal electrode is exposed, the end surface being separated from the internal electrode, and
with a plane including the end surface as a reference plane, a length of the auxiliary internal electrode from the reference plane is larger than a length from the reference plane to an edge of the conductive resin layer.

14. The electronic component according to claim 13, further comprising:
an electrode portion on the end surface including a conductive resin layer.

15. The electronic component according to claim 13, further comprising:
another electrode portion on the side surface including a conductive resin layer, the other electrode portion being separated from the electrode portion and being electrically connected to the internal electrode,
wherein the length of the auxiliary internal electrode from the reference plane is smaller than a length from the reference plane to an edge of the conductive resin layer included in the other electrode portion.

16. The electronic component according to claim 13, further comprising:

a dummy conductor in the same layer as the internal electrode and between the side surface and the internal electrode, the dummy conductor being electrically connected to the other electrode portion.

17. The electronic component according to claim 16, wherein the element body includes another end surface at which the dummy conductor is exposed, the other end surface opposing the end surface, and with a plane including the other end surface as another reference plane, a length of the dummy conductor from the other reference plane is smaller than a length from the other reference plane to an edge of the conductive resin layer included in the electrode portion.

18. The electronic component according to claim 12, wherein the element body includes a main surface adjacent to the side surface and arranged to constitute to a mounting surface, and the electronic component further includes another electrode portion on the main surface including a conductive resin layer.

19. The electronic component according to claim 12, wherein, when the internal electrode and the conductive resin layer included in the electrode portion are viewed from a direction orthogonal to the side surface, the internal electrode and the conductive resin layer included in the electrode portion overlap each other.

20. The electronic component according to claim 12, wherein the conductive resin layer includes a plurality of silver particles.

21. The electronic component according to claim 12, wherein
   the element body includes a dielectric layer in the plane with the internal electrode arranged in the dielectric layer, and
   the dielectric layer includes a region which contains no portion of the internal electrode in a direction perpendicular to the side surface and in which the auxiliary internal electrode is sandwiched between two portions of the dielectric layer in the direction.

22. The electronic component according to claim 12, wherein an element body including a main surface adjacent to the side surface, the electronic component further includes another electrode portion on the main surface including a conductive resin layer, the other electrode portion being not electrically connected to the internal electrode and the outermost internal electrode, when the outermost internal electrode and the conductive resin layer included in the other electrode portion are viewed from a direction perpendicular to the main surface, the outermost internal electrode and the conductive resin layer included in the other electrode portion do not overlap each other, and when the internal electrode and the conductive resin layer included in the other electrode portion are viewed from the direction perpendicular to the main surface, the internal electrode and the conductive resin layer included in the other electrode portion overlap each other.

23. An electronic component, comprising:
an element body of a rectangular parallelepiped shape including a pair of main surfaces opposing each other in a first direction, a pair of end surfaces opposing each other in a second direction, and a pair of side surfaces opposing each other in a third direction;
a plurality of external electrodes disposed on both ends of the element body in the second direction;
a plurality of internal electrodes disposed in the element body to be distributed in the first direction, each of the plurality of internal electrodes being electrically connected to a corresponding external electrode of the plurality of external electrodes; and
a plurality of auxiliary internal electrodes disposed in the same layer as the plurality of internal electrodes to be located between each of the pair of side surfaces and the plurality of internal electrodes, wherein
each of the plurality of external electrodes includes a pair of side surface electrode portions disposed on the pair of side surfaces and including a conductive resin layer,
each of the plurality of auxiliary internal electrodes is electrically connected to the external electrode to which the internal electrode located in the same layer is not electrically connected, and is located between the conductive resin layer to which the internal electrode located in the same layer is not electrically connected and the internal electrode located in the same layer,
each of the plurality of auxiliary internal electrodes is not exposed to a corresponding side surface of the pair of side surfaces,
the element body includes a plurality of dielectric layers distributed in the first direction and each extending in the second direction and the third direction,
each of the plurality of internal electrodes is arranged in a respective dielectric layer and extends in the second direction and the third direction,
at least one of the dielectric layers includes a region which contains no internal electrode in the third direction and in which one of the auxiliary internal electrodes is sandwiched between two portions of the dielectric layer in the third direction, and
an entire portion between the auxiliary internal electrodes, in the region, is exposed at the end surface.

24. The electronic component according to claim 23, wherein, in the two conductive resin layers located on the same side surface, one of the conductive resin layers includes an edge opposing the other conductive resin layer, and with a plane including the end surface as a reference plane, a first length of the auxiliary internal electrode from the reference plane in the second direction is larger than a second length from the reference plane to the edge of the conductive resin layer to which the auxiliary internal electrode is electrically connected and smaller than a third length from the reference plane to the edge of the conductive resin layer to which the auxiliary internal electrode is not electrically connected.

25. The electronic component according to claim 23, wherein each of the plurality of external electrodes includes a pair of main surface electrode portions disposed on the main surface and including a conductive resin layer, the outermost internal electrode includes a first end exposed to the end surface and a second end opposing the first end in the second direction and located in the element body, when the outermost internal electrode and the conductive resin layer included in the main surface electrode portion to which the outermost internal electrode is electrically connected are viewed from the first direction, the second end is exposed from the conductive resin layer included in the main surface electrode portion, when the outermost internal electrode and the conductive resin layer included in the main surface electrode portion to which the outermost internal electrode is not electrically connected are viewed from the first direction, the outermost internal electrode and the conductive resin layer included in the main surface electrode portion do not overlap each other, and when the internal electrode electrically connected to the outermost internal electrode and the conductive resin layer included in the main surface electrode portion to which the outermost internal electrode is not electrically connected are viewed from the first direction, the internal electrode electrically connected to the outermost internal electrode and the conductive resin layer included in the main surface electrode portion overlap each other.

26. The electronic component according to claim 25, further comprising:
an internal conductor located in the same layer as the outermost internal electrode and separated from the outermost internal electrode,
wherein the internal conductor is electrically connected to the external electrode to which the outermost internal electrode located in the same layer as the internal conductor is not electrically connected.

27. The electronic component according to claim 23, further comprising:
a pair of internal conductors disposed between a corresponding main surface of the pair of main surfaces and an outermost internal electrode located on an outermost side in the first direction, among the plurality of internal electrodes, to oppose the outermost internal electrode in the first direction,
wherein each of the plurality of external electrodes includes a pair of main surface electrode portions disposed on the main surface and including a conductive resin layer, and
each of the pair of internal conductors opposes the conductive resin layer included in the main surface electrode portion, to which the outermost internal electrode opposing the internal conductor in the first direction is not electrically connected, in the first direction.

28. The electronic component according to claim 27, further comprising:
a pair of other internal conductors disposed in the same layer as a corresponding internal conductor of the pair of internal conductors,
wherein each of the pair of other internal conductors opposes the conductive resin layer included in the main surface electrode portion, to which the outermost internal electrode opposing the other internal conductors in the first direction is electrically connected, in the first direction.

29. The electronic component according to claim 23, wherein, when the internal electrode and the conductive resin layer included in the side surface electrode portion that are not electrically connected to each other are viewed from the third direction, the internal electrode and the conductive resin layer included in the side surface electrode portion overlap each other.

30. An electronic component, comprising:
an element body including a side surface and an end surface adjacent to the side surface;
an electrode portion on the side surface including a conductive resin layer;
an internal electrode in the element body being not electrically connected to the electrode portion, the internal electrode being located away from the side surface and the end surface in a plane intersecting the side surface; and
an auxiliary internal electrode in the same layer as the internal electrode and between the side surface and the internal electrode, the auxiliary internal electrode being electrically connected to the electrode portion to which the internal electrode is not electrically connected, wherein
the auxiliary internal electrode is not exposed to the side surface and is exposed to the end surface,
the element body includes a dielectric layer in the plane with the internal electrode arranged in the dielectric layer,
the dielectric layer includes a region which contains no portion of the internal electrode in a direction perpendicular to the side surface and in which the auxiliary internal electrode is sandwiched between two portions of the dielectric layer in the direction, and
an entire portion adjacent to the internal electrode in a direction perpendicular to the end surface and to the auxiliary internal electrode in the direction perpendicular to the side surface, in the region, is exposed at the end surface.

31. The electronic component according to claim 30,
wherein the element body includes an end surface at which the auxiliary internal electrode is exposed, the end surface being separated from the internal electrode, and
with a plane including the end surface as a reference plane, a length of the auxiliary internal electrode from the reference plane is larger than a length from the reference plane to an edge of the conductive resin layer.

32. The electronic component according to claim 31, further comprising:
an electrode portion on the end surface including a conductive resin layer.

33. The electronic component according to claim 31, further comprising:
another electrode portion on the side surface including a conductive resin layer, the other electrode portion being separated from the electrode portion and being electrically connected to the internal electrode,
wherein the length of the auxiliary internal electrode from the reference plane is smaller than a length from the reference plane to an edge of the conductive resin layer included in the other electrode portion.

34. The electronic component according to claim 30,
wherein the element body includes a main surface adjacent to the side surface and arranged to constitute to a mounting surface, and
the electronic component further includes another electrode portion on the main surface including a conductive resin layer.

35. The electronic component according to claim 30,
wherein, when the internal electrode and the conductive resin layer included in the electrode portion are viewed from a direction orthogonal to the side surface, the internal electrode and the conductive resin layer included in the electrode portion overlap each other.

* * * * *